US012015627B2

(12) United States Patent
Willis

(10) Patent No.: US 12,015,627 B2
(45) Date of Patent: *Jun. 18, 2024

(54) WEBPAGE INTEGRITY MONITORING

(71) Applicant: SecurityMetrics, Inc., Orem, UT (US)

(72) Inventor: Aaron Willis, Orem, UT (US)

(73) Assignee: SecurityMetrics, Inc., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/355,634

(22) Filed: Jul. 20, 2023

(65) Prior Publication Data

US 2024/0022586 A1    Jan. 18, 2024

Related U.S. Application Data

(63) Continuation of application No. 17/807,840, filed on Jun. 20, 2022, now abandoned, which is a
(Continued)

(51) Int. Cl.
*G06F 21/64*    (2013.01)
*G06F 21/51*    (2013.01)
(Continued)

(52) U.S. Cl.
CPC .......... *H04L 63/1425* (2013.01); *G06F 21/51* (2013.01); *G06F 21/64* (2013.01);
(Continued)

(58) Field of Classification Search
CPC ..... H04L 63/1425; H04L 63/12; H04L 9/321; G06F 21/51; G06F 21/64; G06F 2221/2119
See application file for complete search history.

(56) References Cited

U.S. PATENT DOCUMENTS 7,661,062 B1    2/2010  Connaughton
7,814,172 B2   10/2010  Martin et al.
(Continued)

OTHER PUBLICATIONS

Preethi Natarajan, Janardhan R. Iyengar, Paul D. Amer, and Randall Stewart. 2006. SCTP: an innovative transport layer protocol for the web. In Proceedings of the 15th international conference on World Wide Web (WWW '06). Association for Computing Machinery, New York, NY, USA, 615-624. (Year: 2006).*

(Continued)

*Primary Examiner* — Kari L Schmidt
(74) *Attorney, Agent, or Firm* — Maschoff Brennan

(57) ABSTRACT

A method to monitor integrity of webpages. The method may include obtaining a destination of outgoing network traffic resulting from rendered code of a webpage. The rendered code may be generated using source code of the webpage that is obtained in response to a request to a webserver that hosts the webpage. The method may also include obtaining a previous destination of previous outgoing network traffic resulting from previous rendered code of the webpage. The previous rendered code may be generated before the request is sent to the webserver for the source code used to generate the rendered code. The method may also include comparing the destination and the previous destination to determine a change in integrity of security of the webpage. In response to the change in the integrity of security of the webpage, an alert regarding the integrity of security of the webpage may be generated.

20 Claims, 9 Drawing Sheets

Related U.S. Application Data continuation of application No. 16/410,751, filed on May 13, 2019, now Pat. No. 11,368,477.

(51) Int. Cl.
*H04L 9/32* (2006.01)
*H04L 9/40* (2022.01)

(52) U.S. Cl.
CPC .............. *H04L 9/321* (2013.01); *H04L 63/12* (2013.01); *G06F 2221/2119* (2013.01)

(56) References Cited

U.S. PATENT DOCUMENTS

| | | | |
|---|---|---|---|
| 7,958,555 B1 | 6/2011 | Chen et al. | |
| 8,407,766 B1* | 3/2013 | Newstadt | H04L 63/1416 726/8 |
| 8,621,621 B1* | 12/2013 | Burns | G06F 21/54 726/22 |
| 8,819,819 B1 | 8/2014 | Johnston et al. | |
| 8,875,284 B1* | 10/2014 | Newstadt | H04L 63/145 726/22 |
| 9,026,667 B1* | 5/2015 | Joyce | H04L 63/12 709/224 |
| 9,083,566 B1 | 7/2015 | Pearson et al. | |
| 9,148,445 B2 | 9/2015 | Smith et al. | |
| 9,479,519 B1 | 10/2016 | Hill et al. | |
| 9,819,654 B2 | 11/2017 | Roth et al. | |
| 9,841,863 B1 | 12/2017 | Totale et al. | |
| 10,122,740 B1 | 11/2018 | Finkelshtein et al. | |
| 10,397,265 B2 | 4/2019 | Shekyan et al. | |
| 10,409,995 B1 | 9/2019 | Wasiq et al. | |
| 10,547,628 B2 | 1/2020 | Gorny et al. | |
| 10,735,442 B1 | 8/2020 | Swackhamer | |
| 10,972,484 B1 | 4/2021 | Swackhamer | |
| 11,134,090 B1 | 9/2021 | Swackhamer | |
| 11,188,645 B2 | 11/2021 | Hay et al. | |
| 2006/0085132 A1 | 4/2006 | Sharma et al. | |
| 2007/0220134 A1 | 9/2007 | Cameron et al. | |
| 2008/0010359 A1 | 1/2008 | Achtermann et al. | |
| 2009/0019133 A1 | 1/2009 | Brimley | |
| 2009/0138484 A1 | 5/2009 | Ramos et al. | |
| 2010/0211865 A1 | 8/2010 | Fanning et al. | |
| 2011/0016169 A1 | 1/2011 | Cahill et al. | |
| 2011/0093773 A1 | 4/2011 | Yee | |
| 2011/0161840 A1 | 6/2011 | Wong et al. | |
| 2011/0239300 A1* | 9/2011 | Klein | G06F 21/565 726/23 |
| 2011/0289582 A1* | 11/2011 | Kejriwal | H04L 63/14 726/22 |
| 2012/0222127 A1 | 8/2012 | Boesgaard | |
| 2012/0304295 A1* | 11/2012 | Reumann | H04L 63/1441 726/22 |
| 2013/0212465 A1 | 8/2013 | Kovatch | |
| 2013/0238970 A1* | 9/2013 | Getzin | G06F 16/958 715/234 |
| 2014/0115701 A1 | 4/2014 | Moshchuk et al. | |
| 2014/0129922 A1 | 5/2014 | Gnech et al. | |
| 2014/0173726 A1 | 6/2014 | Varenhorst | |
| 2014/0208199 A1 | 7/2014 | Peleg | |
| 2014/0280468 A1 | 9/2014 | Duncan et al. | |
| 2014/0317735 A1 | 10/2014 | Kolbitsch et al. | |
| 2015/0020194 A1 | 1/2015 | Mraz et al. | |
| 2015/0244738 A1 | 8/2015 | Lu | |
| 2016/0125185 A1 | 5/2016 | Wang et al. | |
| 2016/0142428 A1 | 5/2016 | Pastore et al. | |
| 2016/0163087 A1 | 6/2016 | Cho et al. | |
| 2016/0359871 A1 | 12/2016 | Hansen et al. | |
| 2017/0034195 A1 | 2/2017 | Lee et al. | |
| 2017/0324772 A1 | 11/2017 | Pastore et al. | |
| 2018/0012144 A1* | 1/2018 | Ding | H04L 63/1466 |
| 2018/0048671 A1 | 2/2018 | Shekyan et al. | |
| 2018/0091546 A1 | 3/2018 | Davidson et al. | |
| 2018/0139296 A1 | 5/2018 | Yeh et al. | |
| 2018/0191764 A1 | 7/2018 | Chawla et al. | |
| 2018/0205549 A1 | 7/2018 | Blinn | |
| 2018/0373869 A1* | 12/2018 | Jordan | G06F 21/563 |
| 2019/0068638 A1 | 2/2019 | Bartik et al. | |
| 2019/0124092 A1* | 4/2019 | Deutschmann | H04L 63/0861 |
| 2020/0358818 A1* | 11/2020 | Stoletny | G06F 21/566 |
| 2022/0027428 A1* | 1/2022 | Sutton | G06F 21/563 |
| 2022/0222303 A1* | 7/2022 | Brain | G06F 16/957 |

OTHER PUBLICATIONS

M. Bugliesi, S. Calzavara, R. Focardi, W. Khan and M. Tempesta, "Provably Sound Browser-Based Enforcement of Web Session Integrity," 2014 IEEE 27th Computer Security Foundations Symposium, Vienna, Austria, 2014, pp. 366-380. (Year: 2014).*

Nadji, Yacin, Prateek Saxena, and Dawn Song. "Document Structure Integrity: A Robust Basis for Cross-site Scripting Defense." NDSS. vol. 20. 2009. (Year: 2009).*

S. Chen, J. Meseguer, R. Sasse, H.J. Wang and Y. Wang, "A Systematic Approach to Uncover Security Flaws in GUI Logic," 2007 IEEE Symposium on Security and Privacy (SP '07), Berkeley, CA, 2007, pp. 71-85. (Year: 2007).

Singh, Kapil, et al. "Practical end-to-end web content integrity." Proceedings of the 21st international conference on World Wide Web. ACM, 2012. (Year: 2012).

International Search Report and Written Opinion as issued in connection with International Patent Application No. PCT/US20/31815, dated Jul. 23, 2020.

M. Sonntag, "Securing webpages—An overview," 2010 International Conference on Information Society, 2010, pp. 641-646. (Year: 2010).

F. Mohsen and H. Jafaarian, "Raising the Bar Really High: An MTD Approach to Protect Data in Embedded Browsers," 2019 IEEE 43rd Annual Computer Software and Applications Conference (COMPSAC), 2019, pp. 786-794. (Year: 2019).

Afzali, Hammad, et al. "le-git-imate: Towards verifiable web-based Git repositories," Proceedings of the 2018 on Asia Conference on Computer and Communications Security. 2018, pp. 469-482. (Year: 2018).

* cited by examiner

WEBPAGE INTEGRITY MONITORING

CROSS-REFERENCE TO RELATED APPLICATION

This application is a continuation of U.S. patent application Ser. No. 17/807,840, filed on Jun. 20, 2022, which is a continuation of U.S. patent application Ser. No. 16/410,751, filed on May 13, 2019, the disclosures of which are incorporated herein by reference in their entireties.

FIELD

The embodiments discussed herein are related to monitoring the integrity of webpages.

BACKGROUND

Financial transactions are occurring over the Internet at a rapidly expanding pace as more and more people purchase goods and services online. As a result, more and more companies are offering their goods and services online as well. As more business is conducted online, hackers and others are using more sophisticated techniques to obtain credit card and other financial data of customers of online merchants.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to monitor integrity of webpages. The method may include obtaining, at a computing system, a destination of outgoing network traffic resulting from rendered code of a webpage. The rendered code may be generated using source code of the webpage that is obtained in response to a request to a webserver that hosts the webpage. The method may also include obtaining, at the computing system, a previous destination of previous outgoing network traffic resulting from previous rendered code of the webpage. The previous rendered code may be generated before the request is sent to the webserver for the source code used to generate the rendered code. The method may also include comparing, at the computing system, the destination and the previous destination to determine a change in integrity of security of the webpage. In response to the change in the integrity of security of the webpage, the method may include generating an alert regarding the integrity of security of the webpage.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
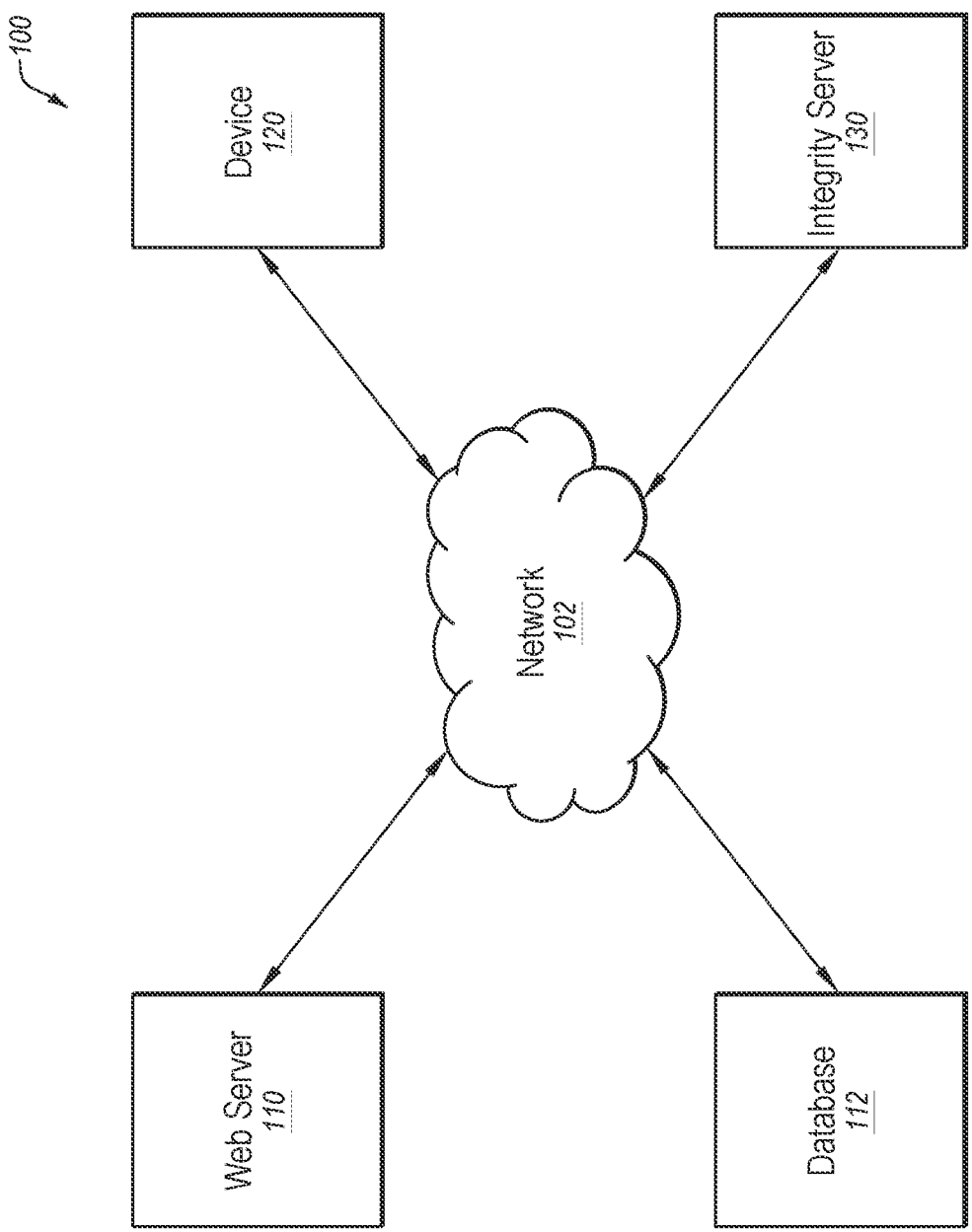
FIG. 1 illustrates an example environment to monitor integrity of webpages.

Some embodiments in this disclosure relate to systems and methods that may be configured to monitor integrity of security of webpages, which may include monitoring the structural integrity/security of the webpages. In some instances, the integrity of security of webpages may be compromised by third parties. The integrity of security of webpages may be compromised by third parties altering the source code or remotely called code of a webpage. The source code or remotely called code of webpages may be altered by the addition of extra code. The extra code may be configured to cause a browser application or other application rendering the webpage to directed data entered into the webpages to unauthorized third parties, such that the third parties steal or capture the data. The data may include financial information, such as a credit card or a bank account number, personal information, such as a social security number or driver license number, among other data. The additional code may not otherwise affect the operability of the webpage such that a user of the webpage or the owner of the webpage may be unaware that the integrity of security of the webpage is compromised.

To monitor the integrity of security of webpages, some web servers may implement software and processes to monitor the source code of the webpages while the source code is stored on the web servers. To monitor the source code, the web servers may use a file integrity monitoring (FIM) process. During a FIM process, monitoring tools on the web server may compare the current source code stored on the web server to a known version of the source code, referred to as known source code. In some embodiments, the known source code may be a clean or known good version of the source code. The known source code may be source code that was previously stored and for which there are no known security integrity issues. Differences between the known source code and the current source code determined based on the comparison may indicate whether the integrity of security of the webpage has been affected. For example, a third party may alter the source code of the webpage to cause the webpage to capture and direct financial information to an address of the third party without changing any other functionality of the webpage. The change in the source code of the webpage may be determined by comparing the source code to the known source code. However, monitoring the source code of the webpage at the web server does not provide an indication of integrity of security of the webpage with respect to altering of remotely called code used by devices to render the webpage.

As used in this disclosure, the source code of a webpage may include code that is stored by the web server in the root directory of a website that includes the webpage. The source code may be written in hypertext markup language (HTML) among other languages or combination of languages. The source code may be code that a web server provides initially in response to a request from a device for the webpage.

Remotely called code as used in this disclosure may include code that is not included in the source code hosted and provided originally by a web server, but code to which a link is included in the source code. The link may be configured to allow a browser application or other application parsing and/or executing the source code or a web server parsing the source code before sending the source code to the browser application or other application to link to and obtain the remotely called code. The remotely called code may be hosted by the web server that hosts the source code or another server or device may host the remotely called code. For example, the link may include a uniform resource identifier that points to additional code that may be downloaded and parsed by the browser application or other application. The remotely called code may include HTML code, Cascading Stylesheets, JavaScript, JQuery, Flash, and ActionScript, among other types of code. The remotely called code may be configured to provide additional visual features, functionality, and/or other features of the webpage not defined by the source code of the webpage.

Rendered code as used in this disclosure may include source code and remotely called code that has been parsed and/or executed by a browser application or other application and is the finalized instructions used by the browser application or other application to layout the presentation of the webpage on a device that requested the webpage from the web server. For example, the rendered code may represent a document object model (DOM) structure. In some embodiments, the rendered code may include elements that are only represented in the rendered code and not represented in the source code and/or the remotely called code without parsing and/or execution of the source code and/or the remotely called code.

Some embodiments in this disclosure relate to systems and methods that may be configured to monitor the integrity of source code and remotely called code by monitoring the rendered code of the webpage. In these and other embodiments, the rendered code of a webpage may be obtained. The rendered code may be generated using source code of the webpage obtained from a web server that hosts the source code and remotely called code referenced in the source code. The rendered code may be compared to a known version of the rendered code referred to as known rendered code. The known rendered code may be rendered code that was previously stored and for which there are no known security integrity issues. Differences between the known rendered code and the rendered code determined based on the comparison may indicate whether the integrity of security of the webpage has been affected. In this manner, changes by a third party to source code and remotely called code of a webpage may be determined. Furthermore, in response to the determination of a change, the code of the webpage that is altered may be reconfigured to remove the changes made by the third party and thereby help to restore the integrity of security of the webpage.

In some embodiments, the rendered code of a webpage may be obtained and analyzed without comparing the rendered code to the known rendered code. In these and other embodiments, elements in the rendered code may indicate a change in the integrity of security of the webpage. For example, in some embodiments, elements in the rendered code that relate to a destination of outbound network traffic resulting from the rendered code may be analyzed. When a destination of outbound network traffic is a recently activated domain or web address, suspicious domain or web address, or domain or web address known to be associated with bad actors, the integrity of security of the webpage may be affected.

In some embodiments, the rendered code of a webpage may not be obtained. Rather, in these and other embodiments, outgoing network traffic resulting from the rendered code may be obtained. For example, the outgoing network traffic resulting from the rendered code may be obtained from a proxy server or application that captures the outbound network traffic. In these and other embodiments, destinations of the outgoing network traffic may be obtained and analyzed to determine a change in the integrity of security of the webpage.

In some embodiments, outgoing network traffic resulting from the known rendered code may be obtained. In these and other embodiments, known destinations may be extracted from the outgoing network traffic resulting from the known rendered code. The known destinations may be compared with the destinations of outgoing network traffic resulting from the rendered code. Differences between the destinations and the known destinations may be determined??? to determine a change in the integrity of security of the webpage.

The systems and methods described in this disclosure set forth a technical solution to a technological problem with respect to webpage security. The technological problem outlined herein regarding the identification of altered source code and altered remotely called code did not exist before computer technology and is directly related to computer technology. The systems and methods described in this disclosure set forth a technical solution to the technical problem that requires implementation by a computer or computer system. The technical solution may include obtaining code over networks, processing the code, comparing the code, and analyzing differences to determine the integrity of security of a webpage. Alternatively or additionally, the systems and methods described in this disclosure may solve other technological problems and provide other technical solutions.

Furthermore, the systems and methods described in this disclosure are at least in the technological field of Internet security, in particular the technological field with respect to website security. The systems and methods described in this disclosure may be relevant and useful in other technological fields as well.

Turning to the figures, FIG. 1 illustrates an example environment 100 to monitor integrity of webpages. The environment 100 may be arranged in accordance with at least one embodiment described in the present disclosure. The environment 100 may include a network 102, a web server 110, a database 112, a device 120, and an integrity server 130.

The network 102 may be configured to communicatively couple the web server 110, the database 112, the device 120, and/or the integrity server 130. In some embodiments, the network 102 may be any network or configuration of networks configured to send and receive communications between systems and devices. In some embodiments, the network 102 may include a wired network, an optical network, and/or a wireless network, and may have numerous different configurations. The network 102 may include one or more devices configured to allow communications between the web server 110, the database 112, the device 120, and/or the integrity server 130.

The web server 110 may include at least memory and a processor. The memory may include instructions that when executed by the processor may cause or direct the web server 110 to perform operations as described in this disclosure, among other operations.

The web server 110 may be configured to host a webpage of a website by storing source code of the webpage. In some embodiments, the webpage may include a field for entering personal data, such as financial data including: credit card information, debit card information, checking or saving account information, and/or other payment account information, among other financial data and/or personal data including: name, address, social security numbers, driver license numbers, passport numbers, and/or other personal information, among other information. For example, the webpage may be a checkout page of a website where a user of the webpage enters financial data. For example, the webpage may be a shopping cart of a website.

In some embodiments, the web server 110 may be configured to receive requests for the webpage from outside sources. For example, browser applications or other applications on devices, such as a browser application or other application on the device 120, may send a request to a URL of the web server 110 to request the webpage. The web server 110 may fulfill the request by sending the source code of the webpage to the requesting device. In these and other embodiments, the source code of the webpage may include one or more links to remotely called code that is not part of the source code of the webpage. In some embodiments, the remotely called code may not be provided by the web server 110 in response to an initial request from a device, such as the device 120, for the source code of the webpage. Alternatively or additionally, in response to an initial request from a device, the web server 110 may obtain the remotely called code and may provide the remotely called code with the source code to the requesting device, such as the device 120.

In some embodiments, the integrity of the source code of the webpage may be monitored. In these and other embodiments, a FIM process may be used to monitor the integrity of the source code. For example, during a FIM process, a version of the source code with no known integrity issues with respect to security of the source code may be obtained. The version of the source code with no known integrity issues with respect to security of the source code may be referred to in this disclosure as known source code.

During a FIM process, at particular times and/or intervals, the source code, which is stored on the web server 110 and that the web server 110 sends in a response to request from devices, may be compared with the known source code. During the FIM process, differences between the source code and the known source code may indicate a change in the integrity of security of the source code. A change in the integrity of security of the source code may indicate a change in the integrity of security of the webpage. A difference may cause an alert to be issued. In response to the alert, the source code may be altered to remove the portion of the code that resulted in the difference between the source code and the known source code. Note that during the FIM process, no monitoring of the remotely called code, which may be provided by the web server 110 with the source code or after providing the source code, may occur.

In some embodiments, another device, such as another server, may perform the FIM process with respect to the source code stored in the web server 110. Alternatively or additionally, the web server 110 may be configured to perform the FIM process. In these and other embodiments, the web server 110 may obtain the known source code from the memory or data storage in the web server 110. Alternatively or additionally, the web server 110 may obtain the known source code from another device.

The database 112 may include at least memory and a processor. The memory may include instructions that, when executed by the processor, may cause or direct the database 112 to perform operations as described in this disclosure, among other operations. The database 112 may be configured to store remotely called code of the webpage hosted by the web server 110. The remotely called code may include code to which a link is included in the source code of the webpage. The remotely called code may be configured to provide additional visual features, functionality, and/or other features of the webpage not defined by the source code of the webpage or to call additional code from another external source. For example, the remotely called code may include HTML code, JavaScript, JQuery, among other types of code.

The database 112 may be configured to receive requests for the remotely called code from outside sources. For example, browser applications or other applications on devices, such as a browser application or other application on the device 120, in response to parsing and/or execution of the source code of the webpage may send a request to a URL of the database 112 to request the remotely called code. The database 112 may fulfill the request by sending the remotely called code to the requesting device.

The device 120 may be any electronic or digital computing device. For example, the device 120 may include a desktop computer, a server, networked computers, a laptop computer, a smartphone, a mobile phone, a tablet computer, smart watch or other smart wearable, or any other computing device that may be used to access a webpage. In some embodiments, the device 120 may include memory and at least one processor. In these and other embodiments, the memory may include computer-readable instructions that are configured to be executed by the processor to cause or direct the device 120 to perform operations described in this disclosure.

The device 120 may include a browser application or other application that may be configured to perform actions with respect to requesting and render webpages. In these and other embodiments, the browser application or other application may be configured to receive instructions from a user and in response to the instructions from the user, request and render webpages. For example, in some embodiments, the device 120 may be configured to request the webpage from the web server 110. In these and other embodiments, the device 120 may request the webpage in response to input from the user.

The device 120 may obtain the source code of the webpage from the web server 110. The browser application or other application on the device 120 may parse and/or execute the source code. During the parsing/execution, the browser application or other application may encounter a link in the source code to remotely called code. The browser application or other application may be configured to request the remotely called code from the database 112 using the link in the source code. Alternatively or additionally, the device 120 may obtain the source code of the webpage and the remotely called code from the web server 110. In these and other embodiments, the web server 110 may encounter the link in the source code to the remotely called code, request the remotely called code, and provide the remotely called code and the source code to the device 120.

After receiving the remotely called code and the source code, the browser application or other application may generate rendered code. The rendered code may be used by the browser application or other application as the directions to paint the webpage on a display of the device 120. Thus, the rendered code may be final code that is generated based on the received remotely called code and source code.

In some embodiments, the device 120 may be configured to obtain a version of the rendered code with no known integrity issues with respect to security of the rendered code. The version of the rendered code with no known integrity issues with respect to security of the rendered code may be referred to in this disclosure as known rendered code. The known rendered code may be generated using a browser application or other application in a manner analogous to the generation of the rendered code. However, the known rendered code may be generated before the generation of the rendered code. Alternatively or additionally, the known rendered code may be generated and checked such that the known rendered code does not include known security integrity issues.

In some embodiments, the device 120 may request the known rendered code from the integrity server 130 and obtain the known rendered code from the integrity server 130. In response to obtaining the known rendered code, the device 120 may be configured to compare the known rendered code to the rendered code to determine differences between the known rendered code and the rendered code. After determining the differences between the known rendered code and the rendered code, the device 120 may be configured to analyze the differences to determine a change in the integrity of security of the webpage. For example, during the analysis, when the device 120 determines that a change is associated with an improper altering of the rendered code, the device 120 may determine that the integrity of security of the webpage has been reduced.

As an example, the webpage may be a checkout page that describes and illustrates a good being purchased and information about a purchaser. Thus, the goods being purchased and information about a purchaser may change for each rendering of the webpage. As a result, the rendered code of the webpage used to paint the display on the device 120 may change for each rendering of the webpage. Thus, a portion of the rendered code may be different than a portion of the known rendered code. The difference between the rendered code and the known rendered code due to a different good being sold or a different purchaser, however, does not indicate that the integrity of security of the webpage has changed. Rather, the difference between the rendered code and the known rendered code due to a different good being sold or a different purchaser is an expected change of the rendered webpage. A change to a portion of the rendered code that is not expected to change based on different renderings of the webpage, however, would be considered an improper altering of the webpage. An improper altering of the webpage would indicate that the integrity of security of the webpage has changed.

In response to a change in the integrity of security of the webpage, the device 120 may be configured to generate an alert regarding the integrity of security of the webpage. The alert may be configured to trigger one or more actions. For example, the alert may trigger the presentation of an indication of the change in integrity of security of the webpage. The presentation of the indication of the change may be displayed on the display of the device 120, may be an audible sound or sounds, may be a vibration, or some other presentation of the indication.

As another example, the alert may be configured to trigger a message to be sent to the integrity server 130. Alternatively or additionally, the alert may be configured to trigger a message to be sent to the web server 110 or another device associated with the web server 110. In response to the message and the alert, the web server 110 and/or the other device may take corrective action to fix the improper altering of the webpage. In these and other embodiments, the message may include an indication of the improper altering of the webpage. Using the indication of the improper altering of the webpage, the improper altering may be fixed.

In some embodiments, the device 120 obtains the known rendered code and uses the known rendered code to determine a change in the integrity of security of the webpage based on one or more instructions executed by the device 120. In some embodiments, the one or more instructions may be part of the source code obtained from the web server 110. In these and other embodiments, the web server 110 may alter the source code to include the instructions to direct the device 120 to determine a change in the integrity of security of the webpage.

Alternatively or additionally, the instructions to direct the device 120 to determine a change in the integrity of security of the webpage may be obtained by the device 120 from the database 112 and/or the integrity server 130. In these and other embodiments, the source code obtained by the device 120 from the web server 110 may include a link to the instructions which the browser application or other application may use to obtain the instructions. Alternatively or additionally, the instructions to direct the device 120 to determine a change in the integrity of security of the webpage may be obtained from an application associated with the browser application or other application. For example, the application may be a plug-in application that is associated with the browser application or other application.

The integrity server 130 may include at least memory and a processor. The memory may include instructions that when executed by the processor may cause or direct the integrity server 130 to perform operations as described in this disclosure.

In some embodiments, the integrity server 130 may be configured to generate the known rendered code. The integrity server 130 may be configured to generate the known rendered code before the device 120 requests the source code from the web server 110. In these and other embodiments, the integrity server 130 may include a browser application or other application, proxy applications, web crawler agents, spiders, and/or bots that may be used during the generation of the known rendered code.

To generate the known rendered code, the integrity server 130 may be configured to request and obtain the source code from the web server 110. After obtaining the source code, the integrity server 130 may be configured to parse and/or execute the source code. In some embodiments, during the parsing/execution, the integrity server 130 may encounter a link in the source code to the remotely called code. The integrity server 130 may be configured to request the remotely called code from the database 112 using the link in the source code. Alternatively or additionally, the integrity server 130 may obtain the remotely called code from the web server 110 with the source code. After receiving the remotely called code and the source code, the integrity server 130 may generate the known rendered code. Alternatively or additionally, the known rendered code may be obtained from other protocols such as FTP, SFTP, and SSH, among others.

Modifications, additions, or omissions may be made to the environment 100 without departing from the scope of the present disclosure. For example, in some embodiments, the environment 100 may not include the database 112. In these and other embodiments, the remotely called code may be hosted by a different device. For example, in some embodiments, the web server 110 may host the remotely called code. In these and other embodiments, the device 120 may request the remotely called code from the web server 110 after obtaining the source code and parsing/executing the source code from the web server 110. Alternatively or additionally, the web server 110 may obtain the remotely called code and provide the source code and the remotely called code to the device 120 without a further request from the device 120.

As another example, the environment 100 may not include the integrity server 130. In these and other embodiments, the device 120 may include the known rendered code. Alternatively or additionally, when the environment 100 does not include the integrity server 130, the device 120 may include a server or network of servers. In these and other embodiments, the device 120 may be controlled by a company or entity whose purpose is to monitor the integrity of security of the webpage. For example, the device 120 may be hosted by an organization that hosts the web server 110 or at the request of an organization that hosts the web server 110. In these and other embodiments, the device 120 may be configured to request the source code from the web server 110 in an effort to monitor the integrity of security of the webpage and not necessarily to use the webpage.

As another example, the device 120 may not include or be configured to obtain instructions to monitor the integrity of security of the webpage. Rather, the device 120 may be configured to provide the rendered code to the integrity server 130. For example, the device 120 may include instructions to provide the rendered code to the integrity server 130. Alternatively or additionally, the source code may include instructions that may direct or cause the device 120 to provide the rendered code to the integrity server 130. In these and other embodiments, the integrity server 130 may be configured to obtain the known rendered code, determine the differences between the known rendered code and the rendered code from the device 120, and may analyze the differences to determine a change in the integrity of security of the webpage. In these and other embodiments, the integrity server 130 may generate the alert regarding the integrity of security of the webpage. The integrity server 130 may generate the alert by changing a status of the webpage within a system that includes the integrity server 130. A change in a status of the webpage may prompt a review or other action with respect to the webpage.

As another example, the database 112 may be another type of device. For example, the database 112 may be a server such as a file server, a mobile device, or any other computing device that is configured to store the remotely called code.

Figure 2A:
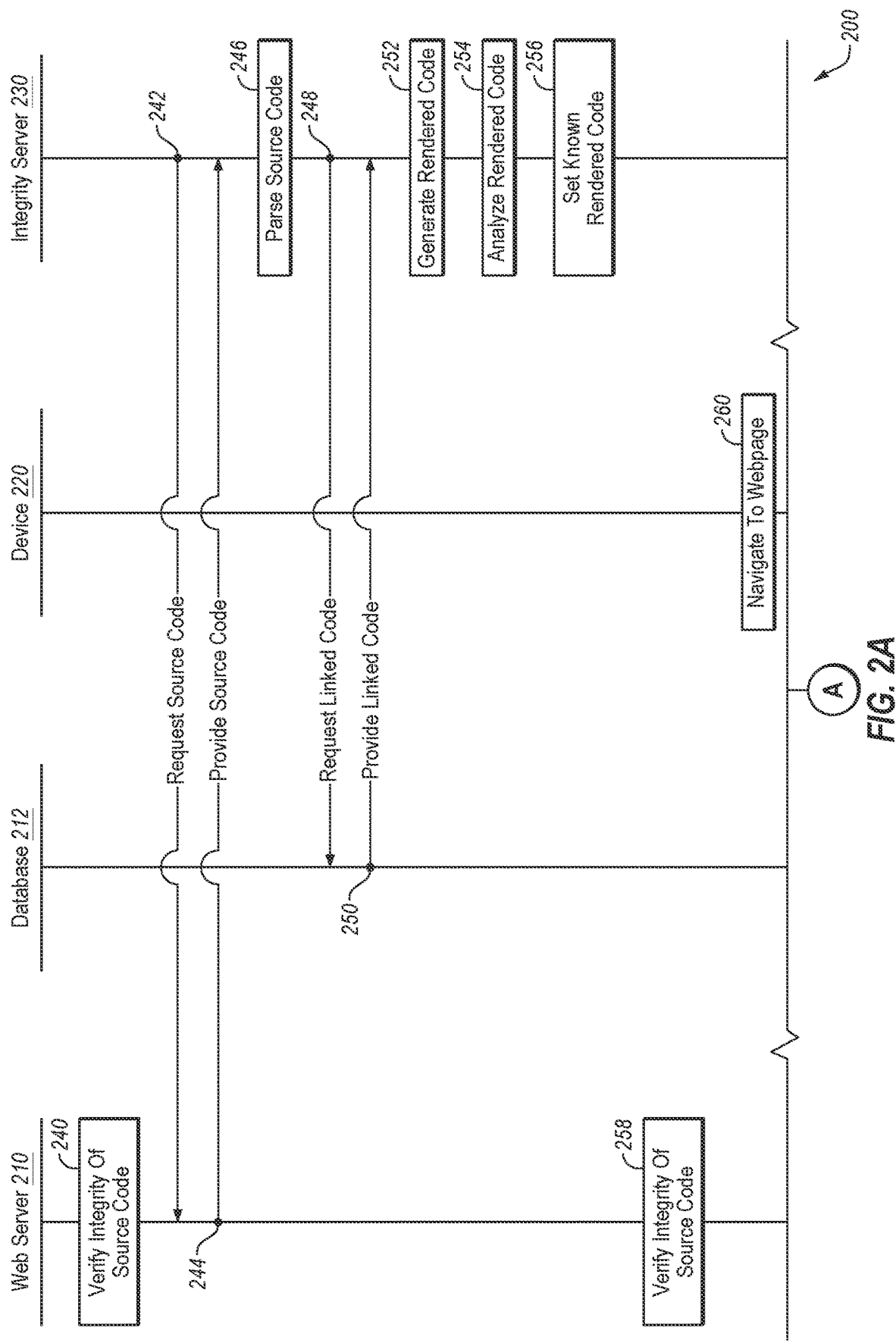
FIGS. 2A and 2B illustrate example operations to monitor integrity of webpages.
Figure 2B:
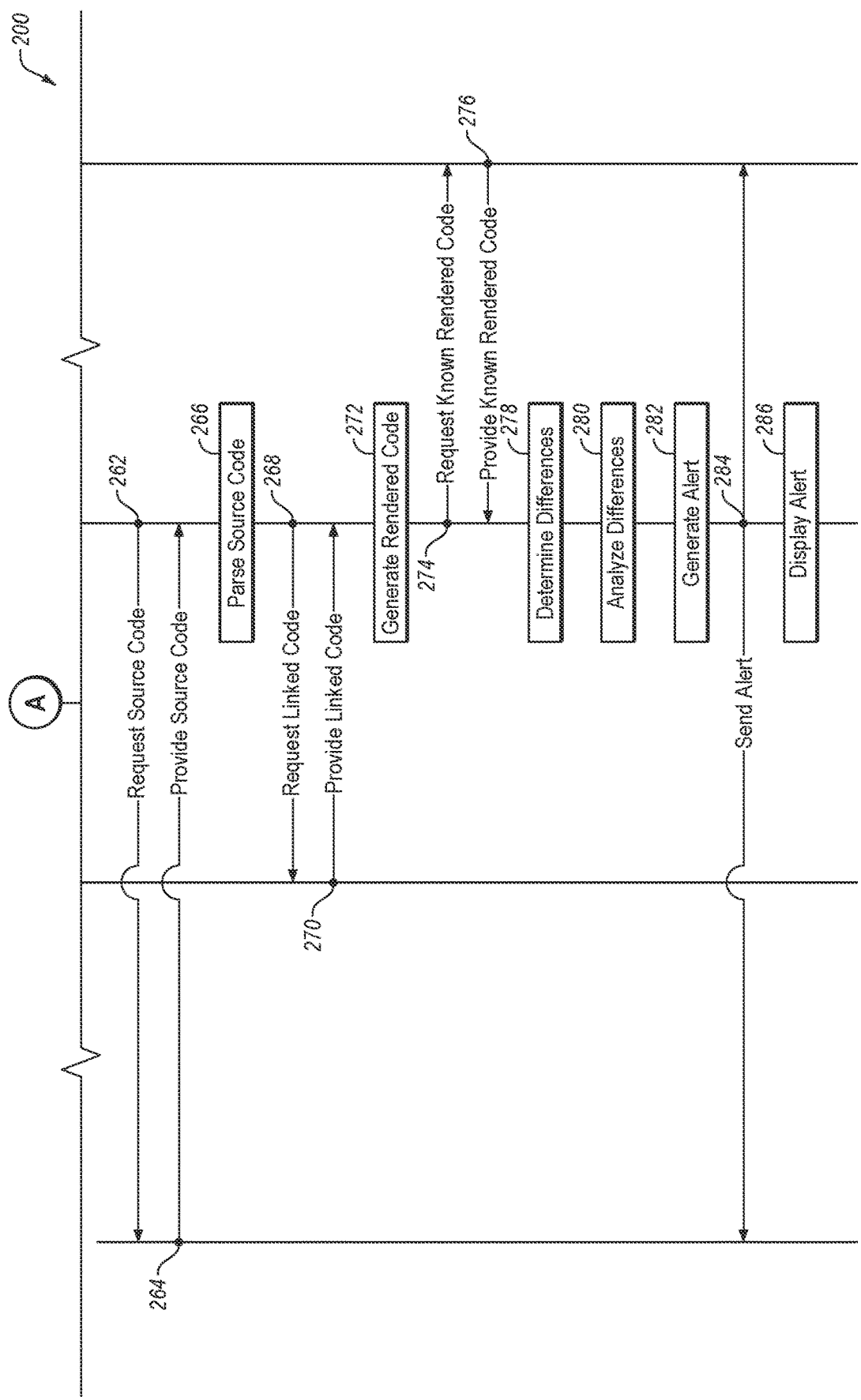

FIGS. 2A and 2B illustrate example operations 200 to monitor integrity of webpages. The operations 200 may be arranged in accordance with at least one embodiment described in the present disclosure. The operations 200 may be between a web server 210, a database 212, a device 220, and an integrity server 230.

In some embodiments, the web server 210, the database 212, the device 220, and the integrity server 230 may be analogous to the web server 110, the database 112, the device 120, and the integrity server 130 of FIG. 1, respectively. Accordingly, no further explanation is provided with respect thereto. Alternatively or additionally, the operations 200 may be an example of the operation of the elements of the environment of FIG. 1.

In some embodiments, the operations 200 may be an example of communications and interactions between the web server 210, the database 212, the device 220, and the integrity server 230. Generally, the operations 200 may relate to monitoring the integrity of security of webpages. The interactions between the web server 210, the database 212, the device 220, and the integrity server 230 may occur over one or more networks. The operations 200 illustrated are not exhaustive but are merely representative of operations 200 that may occur. Furthermore, one operation as illustrated may represent one or more communications, operations, and/or data exchanges.

At operation 240, integrity of security of source code of a webpage may be verified by the web server 210. In some embodiments, another device other than the web server 210 may be configured to verify the integrity of security of the source code. The verifying may be performed using a FIM process or another type of process. The verifying may include determining the source code is the same as previous captured source code for which there are no known security integrity issues. In some embodiments, the operation 240 may be performed as part of a routine verification of the source code and not directly related to the system and method described in this disclosure.

At operation 242, a request for the source code may be sent from the integrity server 230 to the web server 210. In some embodiments, the request may be made by a browser application or other application running on the integrity server 230.

At operation 244, the source code may be provided by the web server 210 to the integrity server 230. The source code may include one or more links to remotely called code.

At operation 246, the source code may be parsed by the integrity server 230. In these and other embodiments, the source code may be parsed by the browser application or other application running on the integrity server 230. Parsing the source code may identify links to remotely called code.

At operation 248, a request for remotely called code may be sent by the integrity server 230 to the database 212. The request may be based on a link in the source code. In these and other embodiments, the link may include a URI or other identifier of the database 212. Alternatively or additionally, the link may include an identifier of the remotely called code to be provided by the database 212. At operation 250, remotely called code may be provided by the database 212 to the integrity server 230.

In some embodiments, the operations 200 may not include the operations 248 and 250. In these and other embodiments, the remotely called code may be provided by the web server 210 in response to the request to provide the source code. In these and other embodiments, the web server 210 may parse the source code to determine the link in the source code. Using the link, the web server 210 may obtain the remotely called code and provide the remotely called code with the source code to the integrity server 230.

At operation 252, the rendered code of the webpage may be generated using the source code from the web server 210 and the remotely called code from the database 212. In these and other embodiments, the rendered code may be generated by the browser application or other application running on the integrity server 230.

At operation 254, the rendered code of the webpage may be analyzed. In these and other embodiments, the rendered code may be analyzed to identify indicators that the integrity of security of the webpage is compromised. The indicators may include code that is associated with malware or that does not adhere with typical practice. Indicators may include tags, scripts, characters, comment blocks, calls, or other functions that are atypical, associated with malware, or otherwise appear out of place. The rendered code may also be analyzed with respect to the network connections established as directed by the rendered code. In particular, the network connections may be analyzed to identify connections that are atypical based on the location of the connection, timing of the connection, and/or the data transmitted over the network connections. In some embodiments, the network connections may be analyzed using heuristic scans, artificial intelligence, or other analysis techniques.

At operation 256, the rendered code may be set as known rendered code. In these and other embodiments, the rendered code may be set as the known rendered code in response to the analysis of the rendered code not identifying indicators that the integrity of security of the webpage is compromised.

In some embodiments, the integrity server 230 may be configured to generate multiple different versions of the known rendered code. The different versions of the known rendered code may be generated to account for different versions of the source code associated with different requesting devices. For example, the web server 210 may host multiple different types of source code for a single webpage. The different types of source code may be provided by the web server 210 in response to the type of device that is requesting the webpage. For example, the web server 210 may include source code for providing in response to a request from a personal computer that is different from the source code provided to a mobile device.

Alternatively or additionally, the different versions of the known rendered code may be generated to account for variations in rendered code that may occur based on the browser application or other application that generates the rendered code. For example, a first browser application or other application and a second browser application or other application using the same source code and remotely called code may generate different rendered code.

In some embodiments, one or more of the operations of 242, 244, 246, 248, 250, 252, 254, and 256 may be repeated by the integrity server 230 to generate different versions of the rendered code to account for the different browser applications or other applications that may generate the rendered code and the variations in source code provided by the web server 210.

At operation 258, integrity of security of the source code of the webpage may be verified. The operation 258 may be performed in a manner analogous to or different from the operation 240. The operation 258 may be performed after the operation 256. The operation 258 may be performed as part of routine verification of the source code and not directly related to the system and method described in this disclosure.

At operation 260, a request to navigate to the webpage may be obtained by the device 220. The request may be obtained from a user of the device 220. The request may be provided to a browser application or other application that is running on the device 220.

At operation 262, a request for the source code may be sent from the device 220 to the web server 210. The request for the source code may be in response to the request to navigate to the webpage. In some embodiments, the request may be made by the browser application or other application running on the device 220.

At operation 264, the source code may be provided by the web server 210 to the device 220. The source code may include one or more links to remotely called code and may be analogous to the source code provided by the web server 210 to the integrity server 230.

At operation 266, the source code may be parsed by the device 220. In these and other embodiments, the source code may be parsed by the browser application or other application running on the device 220. Parsing the source code may identify links to remotely called code.

At operation 268, a request for remotely called code may be sent by the device 220 to the database 212. The request may be based on a link in the source code. In these and other embodiments, the link may include a URI or other identifier of the database 212. Alternatively or additionally, the link may include an identifier of the remotely called code to be provided by the database 212. At operation 270, the remotely called code may be provided by the database 212 to the device 220.

In some embodiments, the operations 200 may not include the operations 268 and 270. In these and other embodiments, the remotely called code may be provided by the web server 210 in response to the request to provide the source code. In these and other embodiments, the web server 210 may parse the source code to determine the link in the source code. Using the link, the web server 210 may obtain the remotely called code and provide the remotely called code with the source code to the device 220.

At operation 272, the rendered code of the webpage may be generated using the source code from the web server 210 and the remotely called code from the database 212. In these and other embodiments, the rendered code may be generated by the browser application or other application running on the device 220.

At operation 274, a request for known rendered code may be sent from the device 220 to the integrity server 230. The request for the known rendered code may include, an indication of the webpage, the type of the integrity server 230, and the type of the browser application or other application that is running on the device 220 that generated the rendered code.

At operation 276, the known rendered code may be provided by the integrity server 230 to the device 220. In some embodiments, the known rendered code that is provided may be selected based on the type of the device 220 and the type of the browser application or other application. For example, the integrity server 230 may include known rendered code for multiple different webpages. Based on the indication of the webpage, the integrity server 230 may source the known rendered webpage for the webpage rendered by the device 220.

Alternatively or additionally, the integrity server 230 may include multiple different versions of the known rendered code for the same webpage. The different versions of the known rendered code may be rendered by different combinations of devices and/or browser application or other applications. For example, a first version of the known rendered code may be generated by a mobile device using a first browser application or other application type. A second version of the known rendered code may be generated by a mobile device using a second browser application or other application type. A third version of the known rendered code may be generated by a desktop personal computer using the first browser application or other application type. In these and other embodiments, the integrity server 230 may select the known rendered code based on the type of the device 220, the type of the browser application or other application, or the type of the device 220 and the type of the browser application or other application.

At operation 278, the rendered code may be compared to the known rendered code by the device 220 to determine differences between the rendered code and the known rendered code. In some embodiments, the rendered code and the known rendered code may be hashed before the comparison. In these and other embodiments, the rendered code and the known rendered code may be hashed in different manners. For example, a line by line hash of the rendered code and the known rendered code may be performed. Alternatively or additionally, document model object nodes of the rendered code and the known rendered code may be hashed.

In these and other embodiments, the hashes of the rendered code and the known rendered code may be compared. For example, the comparison may be performed using fuzzing hashing algorithms among other type of comparison algorithms. In these and other embodiments, the known rendered code provided by the integrity server 230 may be in hashed form.

At operation 280, the differences between the rendered code and the known rendered code may be analyzed. The analysis of the differences may be performed to determine a change in integrity of security of the webpage.

In some embodiments, not all differences between the rendered code and the known rendered code may result in the analysis indicating a change in the integrity of security of a webpage. For example, the webpage may be a checkout page that describes and illustrates a good being purchased and information about a purchaser. When the device 220 requests the checkout page for a first time, the checkout page may include a first good. When the device 220 requests the checkout page for a second time, the checkout page may include a second code. If a different device requests the checkout page, the good and/or personal information on the checkout page may be different. As a result, at least a portion of the rendered code of the webpage used to paint the display on the device 220 may change for each rendering of the webpage based on certain information used during a browsing session that requests the webpage. Alternatively or additionally, a portion of the rendered code of the webpage used to paint the display on the device 220 may not change for each rendering of the webpage even with different information being used during a browsing session that requests the webpage.

Because at least a portion of the rendered code of the webpage may change for each rendering of the webpage, a portion of the rendered code may be different than a portion of the known rendered code. Likewise a portion of the rendered code may be the same as a portion of the known rendered code. In these and other embodiments, the analysis may include analyzing comparisons of different portions of the rendered code differently. In these and other embodiments, a portion of the rendered code may include an HTML object or multiple HTML objects, among other divisions of the rendered code.

For portions of the rendered code that are expected to be the same as the known rendered code, any differences between the rendered code and the known rendered code in these portions may be an indication of a change in integrity of security of the webpage.

For portions of the rendered code that are expected to not be the same as the known rendered code, an amount of the difference between the rendered code and the known rendered code may be compared to a threshold difference amount. The amount of the difference between the rendered code and the known rendered code in these portions being above a threshold difference amount may indicate a change in integrity of security of the webpage. In these and other embodiments, the difference being below the threshold difference amount may not be an indication of a change in integrity of security of the webpage even though a difference exists.

The threshold difference amount may vary based on each portion of the code being analyzed. For example, a first portion of rendered code that includes customer information displayed on the webpage may have a corresponding threshold difference amount greater than a second portion of rendered code that includes shipping options displayed on the webpage because the customer information may be expected to vary more than shipping options for different renderings of the webpage. In these and other embodiments, the threshold difference amount may be determined based on an expected change in the portion of the rendered code to which the threshold difference corresponds. The expected change may be determined based on known variances of information to be included in the portions of the source code, remotely called code, or rendered code.

At operation 282, an alert may be generated in response to a change in the integrity of security of the webpage. The alert may be regarding the integrity of security of the webpage. The alert may be a trigger for the device 220 or other devices to perform functions with respect to a change in the integrity of security of the webpage.

At operation 284, the alert may be provided to other devices. For example, the alert may be provided to the integrity server 230 or the web server 210, among other devices. In some embodiments, when the integrity server 230 receives the alert, the integrity server 230 may provide the alert to the web server 210. Alternatively or additionally, the integrity server 230 may provide the alert to another device associated with an organization that controls the web server 210.

In some embodiments, the web server 210 may take action in response to the alert. For example, the web server 210 may disable a portion or all of the webpage. For example, the web server 210 may indicate to request for the webpage that the webpage is no longer active. Alternatively or additionally, the web server 210 may send out notices to other servers associated with the web server 210 regarding the alert. Alternatively or additionally, the web server 210 may provide notices to other devices that have received the webpage regarding the change in integrity of security of the webpage. Alternatively or additionally, the web server 210 may be configured to alert a webmaster or other person associated with managing the web server 210.

At operation 286, an alert may be displayed by the device 220. The alert may be displayed on a display of the device 220 that is concurrently displaying the webpage. The alert may indicate that the integrity of security of the webpage may be comprised. Alternatively or additionally, the alert may indicate how the integrity of security of the webpage may be comprised. For example, the alert may indicate or include the portion of the rendered code that results in a change in integrity of security of the webpage. In these and other embodiments, the portion of the rendered code included may include the source code and/or remotely called code used to generate the rendered code.

In some embodiments, the alert may disable portions of the webpage. For example, the alert may disable network connections established by the webpage. Alternatively or additionally, the alert may disable the entire webpage.

Modifications, additions, or omissions may be made to the operations 200 without departing from the scope of the present disclosure. For example, in some embodiments, the operations 200 may include one or more additional operations. For example, the operations 200 may include analysis of the rendered code that is not based on the differences between the rendered code and the known rendered code. For example, the rendered code may be analyzed to identify indicators that the integrity of security of the webpage is compromised. The indicators may include code that is associated with malware or that does not adhere with typical practice. Indicators may include tags, scripts, characters, comment blocks, calls, or other functions that are atypical, associated with malware, or otherwise appear out of place. The rendered code may also be analyzed with respect to the network connections established as directed by the rendered code. In particular, the network connections may be analyzed to identify connections that are atypical based on the location of the connection, timing of the connection, and/or the data transmitted over the network connections. In some embodiments, the network connections may be analyzed using heuristic scans, artificial intelligence, or other analysis techniques. In these and other embodiments, when the analysis of the rendered code indicates a change in the integrity of security of the webpage, the alert may be generated.

As another example, in some embodiments, the operations 200 may be arranged in a different order. For example, the operations 274 and 276 may occur before the operation 272. Alternatively or additionally, in some embodiments, one or more of the operations 200 may not be included. For example, the operations of 240 and/or 258 may not be included. Alternatively or additionally, the operation 254 may not be included. Alternatively or additionally, the operation 278 may not be included. In these and other embodiments, the analysis of the rendered code may include identifying indicators that the integrity of security of the webpage is compromised.

As another example, in some embodiments, none of the operations may be performed by the integrity server 230. In these and other embodiments, the device 220 may perform all of the operations associated with the integrity server 230. Alternatively or additionally, none of the operations may be performed by the database 212. In these and other embodiments, the web server 210 may perform all of the operations associated with the database 212. Alternatively or additionally, the integrity server 230 may perform some of the operations performed by the device 220. For example, the integrity server 230 may perform operations 278, 280, 282, and 284 after the device 220 provides the rendered code to the integrity server 230.

Figure 3:
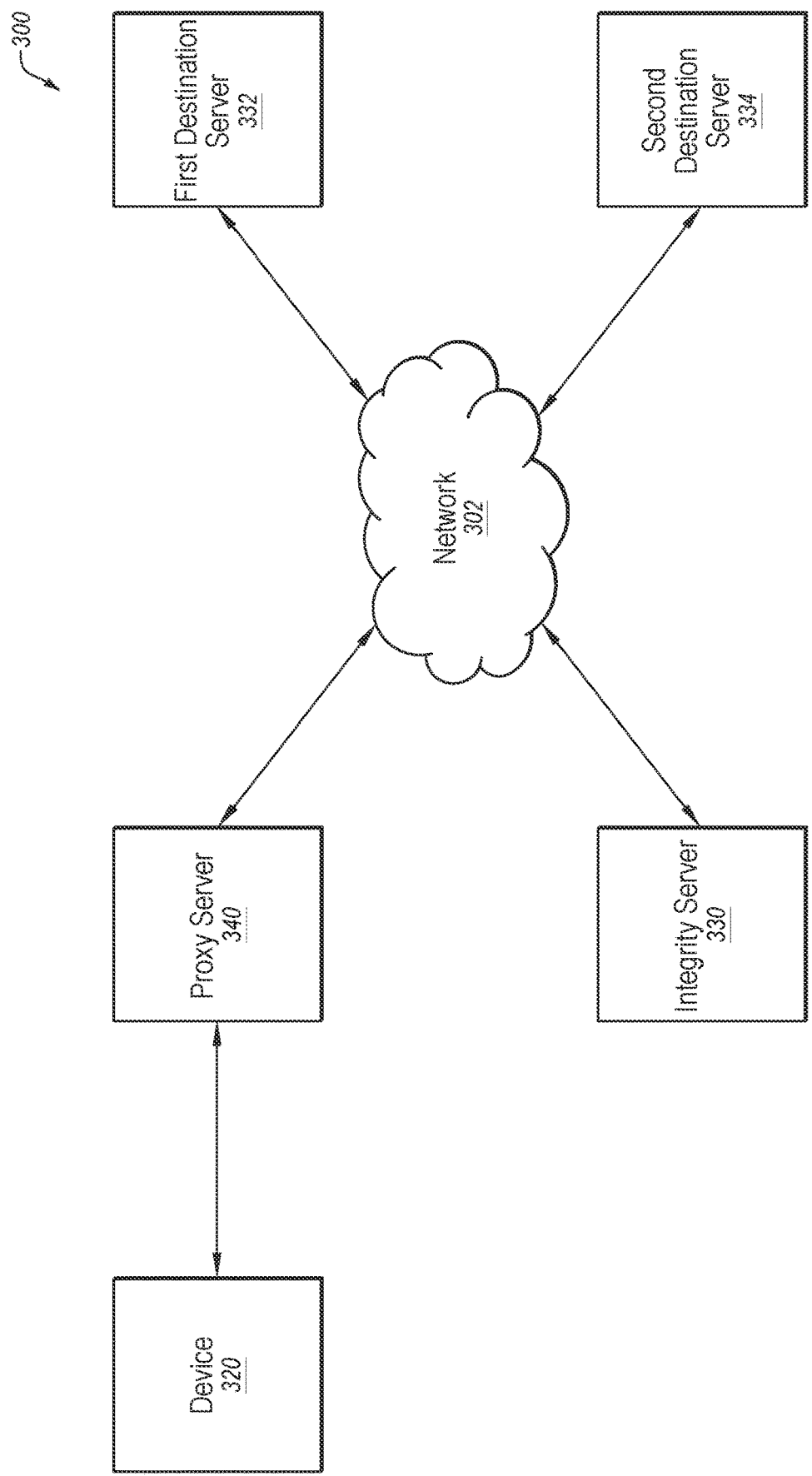
FIG. 3 illustrates another example environment to monitor integrity of webpages.

FIG. 3 illustrates an example environment 300 to monitor integrity of webpages. The environment 300 may be arranged in accordance with at least one embodiment described in the present disclosure. The environment 300 may include a network 302, a device 320, an integrity server 330, a first destination server 332, a second destination server 334, and a proxy server 340.

The network 302 may be configured to communicatively couple the integrity server 330, the first destination server 332, the second destination server 334, and the proxy server 340. In some embodiments, the network 302 may be any network or configuration of networks configured to send and receive communications between systems and devices. In some embodiments, the network 302 may include a wired network, an optical network, and/or a wireless network, and may have numerous different configurations. The network 302 may include one or more devices configured to allow communications between the integrity server 330, the first destination server 332, the second destination server 334, and the proxy server 340.

The device 320 may be any electronic or digital computing device and may be analogous to the device 120 of FIG. 1. The device 320 may obtain source code of a webpage from a web server. A browser application or other application on the device 320 may parse and/or execute the source code. During the parsing/execution, the browser application or other application may encounter a link in the source code to remotely called code. The browser application or other application may be configured to request the remotely called code from a data storage server or the web server using the link in the source code.

After receiving the remotely called code and the source code, the browser application or other application may generate rendered code. The rendered code may be used by the browser application or other application as the directions to paint the webpage on a display of the device 320. Thus, the rendered code may be final code that is generated based on the received remotely called code and source code.

In some embodiments, the device 320 may be configured to analyze the rendered code. For example, the rendered code may be analyzed to identify indicators that the integrity of security of the webpage is compromised. The indicators may include code that is associated with malware or that does not adhere with typical practice. Indicators may include tags, scripts, characters, comment blocks, calls, or other functions that are atypical, associated with malware, or otherwise appear out of place. For example, the rendered code may be analyzed using heuristic scans, artificial intelligence, or other analysis techniques.

Alternately or additionally, the device 320 may also use other analysis techniques to determine a change in the integrity of security of the webpage. For example, the device 320 may include techniques associated with Subresource Integrity checking of the source code or the remotely called code of the webpage. Alternately or additionally, the device 320 may implement Content Security Policy procedures to reduce the likelihood of rendered code changing the integrity of security of the webpage.

In some embodiments, the rendered code may also be analyzed with respect to the network connections established as directed by the rendered code. For example, the network connections may be outgoing network traffic such as hypertext transfer protocol (HTTP) posts. In these and other embodiments, the network connections may be analyzed to identify connections that are atypical based on the timing of the connection and/or the data transmitted over the network connections. In some embodiments, the network connections may be analyzed using heuristic scans, artificial intelligence, or other analysis techniques. In these and other embodiments, when the analysis of the rendered code indicates a change in the integrity of security of the webpage, an alert may be generated.

In some embodiments, the rendered code may also be analyzed with respect to destinations of outgoing network traffic resulting from the rendered code. For example, the destinations of outgoing network traffic may be obtained from the rendered code. Alternately or additionally, the destinations of the outgoing network traffic may be obtained from an application running on the device 320. For example, the application may be configured to monitor the network traffic of the browser application or other application to obtain destinations of outgoing network traffic from the browser application or other application. The destinations may include a network address, such as an internet protocol (IP) address, a media access control (MAC) address, a host address, a domain address, a server address, among other network destinations. In some embodiments, the destinations may be final network destinations. A final network destination may indicate that the destination is the last or ending destination of the outgoing network traffic.

In response to obtaining the destinations, the destinations may be analyzed. For example, the destinations may be analyzed to determine if the destinations may indicate a threat to the integrity of security of the webpage. For example, destinations that may indicate a threat may include destinations that include a recently activated domain or web address, a suspicious domain or web address, an unknown domain or web address, or a domain or web address known to be associated with bad actors. In these and other embodiments, the analysis of the destinations may include comparing the destinations to a list or database of destinations with corresponding labels. If the destinations are determined to match one or more list or database destinations with labels that may indicate a threat to the integrity of security of the webpage, a change to the integrity of security of the webpage may be determined. In these and other embodiments, when the analysis of the destinations indicates a change in the integrity of security of the webpage, an alert may be generated.

In some embodiments, the device 320 may communicate with the network 302 through the proxy server 340. The proxy server 340 may include at least memory and a processor. The memory may include instructions that when executed by the processor may cause or direct the proxy server 340 to perform operations as described in this disclosure, among other operations.

In general, the proxy server 340 may be configured to act as a gateway between the device 320 and the network 302. In these and other embodiments, network traffic from the device 320 may pass through the proxy server 340. The proxy server 340 may be configured to capture the outgoing network traffic from the device 320. In response to capturing the outgoing network traffic, the proxy server 340 may parse the outgoing network traffic to determine destinations of the outgoing network traffic.

In some embodiments, the proxy server 340 may analyze the destinations in a manner analogous to the analysis described above to determine a change in the integrity of security of the webpage. Alternately or additionally, the proxy server 340 may provide the destinations to the device 320 and/or the integrity server 330. In these and other embodiments, the device 320 and/or the integrity server 330 may analyze the destinations.

In some embodiments, the device 320 may be configured to obtain destinations of outgoing network traffic resulting from known rendered code of the webpage with no known integrity issues with respect to security of the known rendered code. For example, the destinations resulting from known rendered code may not indicate a threat to the integrity of security of the webpage. The destinations of outgoing network traffic resulting from known rendered code of the webpage with no known integrity issues may be referred to as known destinations.

In some embodiments, the device 320 may obtain the known destinations from an application running on the device 320. In these and other embodiments, the application may capture outgoing network traffic resulting from the known rendered code. The device 320 may parse the outgoing network traffic to determine the known destinations.

Alternately or additionally, the device 320 may obtain the known destinations from the proxy server 340. In these and other embodiments, the proxy server 340 may be configured to obtain the known destinations from network traffic passing through the proxy server 340 resulting from known rendered code on the device 320.

In some embodiments, the device 320 may be configured to analyze destinations of outgoing network traffic resulting from the rendered code of the webpage by comparing the destinations of outgoing network traffic of the webpage to known destinations of outgoing network traffic of the webpage. Differences between the destinations of outgoing network traffic and the known destinations of outgoing network traffic may indicate a change in integrity of security of the webpage.

For example, the destinations of outgoing network traffic may include multiple destinations and the known destinations of outgoing network traffic may include multiple destinations. A number of the destinations of outgoing network traffic not matching a number of the known destinations of outgoing network traffic may indicate a change in integrity of security of the webpage. Alternately or additionally, when the number of the destinations of outgoing network traffic matches a number of the known destinations of outgoing network traffic but one or more of the destinations of outgoing network traffic is not the same as the known destinations of outgoing network traffic, a change in integrity of security of the webpage may be indicated.

In some embodiments, the device 320 may obtain the known destinations from the integrity server 430. In response to obtaining the known destinations, the device 320 may be configured to compare the known destinations to the destinations to determine differences between the known destinations and the destinations. After determining the differences between the known destinations and the destinations, the device 320 may determine that the integrity of security of the webpage has been reduced.

As an example, the webpage may be a checkout page that describes and illustrates a good being purchased and credit card information of a purchaser. As another example, the webpage may be a shopping cart of a website. Upon request to pay for the good, the webpage may send the credit card information via an HTTP post to a financial institution to handle the payment for the good. The financial institution may be associated with the first destination server 332. Thus, the network address of the first destination server 332 may be a known destination of the HTTP post. The webpage may also have been altered to include instructions to send the credit card information to the second destination server 334. Thus, in this transaction, the destinations may include the first destination server 332 and the second destination server 334. The known destination may include only the first destination server 332. Thus, comparing the destinations to the known destination may result in a determination that a number of destinations is different from a number of the known destinations. A difference between the number of destinations and the number of known destinations may indicate that the integrity of security of the webpage has changed.

Alternately or additionally, in place of or additionally to comparing the number of destinations to a number of the known destinations, the first destination server 332 and the second destination server 334 may be analyzed to determine if the first destination server 332 and the second destination server 334 indicate a threat to the integrity of security of the webpage.

In response to a change in the integrity of security of the webpage, the device 320 may be configured to generate an alert regarding the integrity of security of the webpage. The alert may be configured to trigger one or more actions. For example, the alert may trigger the presentation of an indication of the change in integrity of security of the webpage. The presentation of the indication of the change may be displayed on the display of the device 320, may be an audible sound or sounds, may be a vibration, or some other presentation of the indication.

In some embodiments, the device 320 obtains the destinations and uses the known destinations to determine a change in the integrity of security of the webpage based on one or more instructions executed by the device 320. In some embodiments, the one or more instructions may be part of the source code obtained from the web server. In these and other embodiments, the web server may alter the source code to include the instructions to direct the device 320 to determine a change in the integrity of security of the webpage.

Alternatively or additionally, the instructions to direct the device 320 to determine a change in the integrity of security of the webpage may be obtained by the device 320 from the integrity server 330. In these and other embodiments, the source code obtained by the device 320 may include a link to the instructions which the browser application or other application may use to obtain the instructions. Alternatively or additionally, the instructions to direct the device 320 to determine a change in the integrity of security of the webpage may be obtained from an application associated with the browser or other application. For example, the application may be a plug-in application that is associated with the browser application or any other application.

The integrity server 330 may include at least memory and a processor. The memory may include instructions that when executed by the processor may cause or direct the integrity server 330 to perform operations as described in this disclosure.

In some embodiments, the integrity server 330 may be configured to generate the known destinations. The integrity server 330 may be configured to generate the known destinations before the device 320 requests the source code from the web server. In these and other embodiments, the integrity server 330 may include a browser application, proxy applications or proxy server, an application, web crawler agents, spiders, and/or bots that may be used during the generation of the known destinations.

To generate the known destinations, the integrity server 330 may be configured to request and obtain the source code from the web server. After obtaining the source code, the integrity server 330 may be configured to parse and/or execute the source code, to obtain remotely called code, and/or to generate the known rendered code. Alternatively or additionally, the known rendered code may be obtained from other protocols such as FTP, SFTP, HTTP, HTTPS, SCP and SSH, among others. Using the known rendered code, the integrity server 330 may determine the known destinations.

Modifications, additions, or omissions may be made to the environment 300 without departing from the scope of the present disclosure. As an example, the environment 300 may not include the integrity server 330. In these and other embodiments, the device 320 may include the known destinations. Alternately or additionally, when the environment 100 does not include the integrity server 330, the device 320 may include a server or network of servers. In these and other embodiments, the device 320 may be controlled by a company or entity whose purpose is to monitor the integrity of security of the webpage. For example, the device 320 may be hosted by an organization that hosts the web server or at the request of an organization that hosts the web server. In these and other embodiments, the device 320 may be configured to request the source code from the web server 310 in an effort to monitor the integrity of security of the webpage and not necessarily to use the webpage as a consumer of goods of the webpage.

As another example, the device 320 may not be included or be configured to obtain instructions to monitor the integrity of security of the webpage. Rather, the proxy server 340 or the device 320 may be configured to provide the destinations to the integrity server 330. The integrity server 330 may analyze the destinations and/or compare the destinations to known destinations. In these and other embodiments, the integrity server 330 may generate the alert regarding the integrity of security of the webpage.

Figure 4:
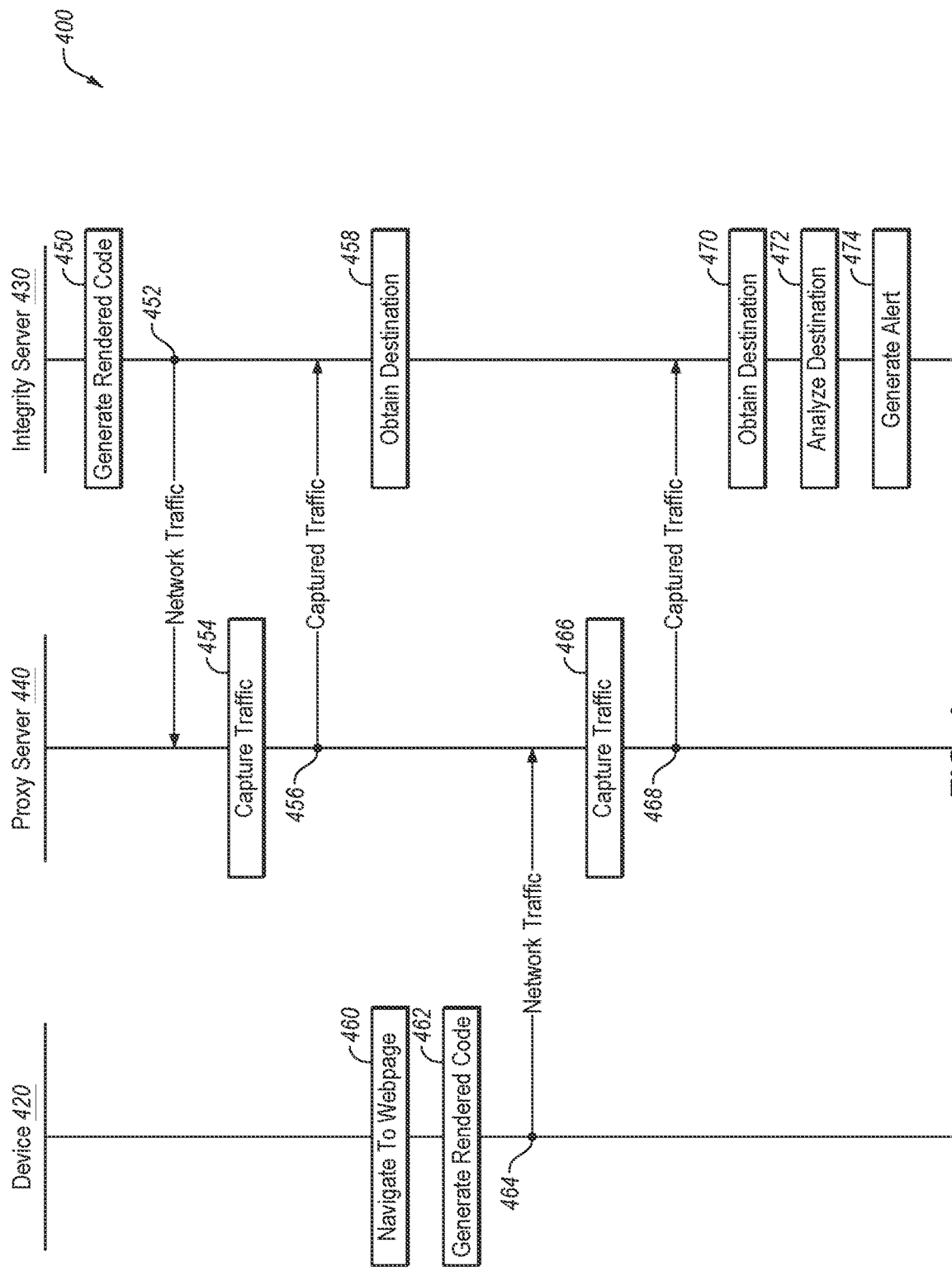
FIG. 4 illustrates other example operations to monitor integrity of webpages.

FIG. 4 illustrates example operations 400 to monitor integrity of webpages. The operations 400 may be arranged in accordance with at least one embodiment described in the present disclosure. The operations 400 may be between a device 420, an integrity server 430, and a proxy server 440.

In some embodiments, the device 420, the integrity server 430, and the proxy server 440 may be analogous to the device 320, the integrity server 330, and the proxy server 340 of FIG. 3, respectively. Accordingly, no further explanation is provided with respect thereto. Alternatively or additionally, the operations 400 may be an example of the operation of the elements of the environment 300 of FIG. 3.

In some embodiments, the operations 400 may be an example of communications and interactions between the device 420, the integrity server 430, and the proxy server 440. Generally, the operations 400 may relate to monitoring the integrity of security of webpages. The interactions between the device 420, the integrity server 430, and the proxy server 440 may occur over one or more networks. The operations 400 illustrated are not exhaustive but are merely representative of operations 400 that may occur. Furthermore, one operation as illustrated may represent one or more communications, operations, and/or data exchanges.

At operation 450, rendered code of the webpage may be generated using source code from a web server and remotely called code. In these and other embodiments, the rendered code may be generated by a browser application or other application running on the integrity server 430.

At operation 452, outgoing network traffic resulting from the rendered code may be directed to the proxy server 440 from the integrity server 430. The outgoing network traffic may include destinations.

At operation 454, the proxy server 440 may capture the outgoing network traffic from the integrity server 430. At operation 456, the proxy server 440 may send the capture outgoing network traffic to the integrity server 430. At operation 458, the integrity server 430 may parse the outgoing network traffic to obtain the destinations of the outgoing network traffic. The destinations obtained may be known destinations of outgoing network traffic of the webpage.

At operation 460, a request to navigate to the webpage may be obtained by the device 420. The request may be obtained from a user of the device 420. The request may be provided to a browser application or other application that is running on the device 420.

At operation 462, rendered code of the webpage may be generated using source code of the webpage and remotely called code that is referenced in the source code. In these and other embodiments, the rendered code may be generated by the browser application or other application running on the device 420.

At operation 464, outgoing network traffic resulting from the rendered code on the device 420 may be sent to the proxy server 440 in route to one or more destinations of the outgoing network traffic.

At operation 466, the proxy server 440 may capturing the outgoing network traffic from the device 420. At operation 468, the proxy server 440 may provide the outgoing network traffic to the integrity server 430.

At operation 470, the integrity server 430 may parse the outgoing network traffic to obtain destinations of the outgoing network traffic resulting from the rendered code on the device 420. At operation 472, the integrity server 430 may analyze the destinations to determine if the destinations indicate a threat to the integrity of security of the webpage. Analysis of the destinations may include comparing the destinations to the known destinations. Alternately or additionally, analysis of the destinations may include comparing the destinations to a list or database of destinations to determine if the destinations may indicate a threat to the integrity of security of the webpage.

At operation 474, an alert may be generated in response to a change in the integrity of security of the webpage. The alert may be regarding the integrity of security of the webpage. The alert may be a trigger for the integrity server 430 or other devices to perform functions with respect to a change in the integrity of security of the webpage.

Modifications, additions, or omissions may be made to the operations 400 without departing from the scope of the present disclosure. For example, in some embodiments, the operations 400 may include one or more additional operations. For example, the operations 400 may include analysis of the rendered code. For example, the rendered code may be analyzed to identify indicators that the integrity of security of the webpage is compromised in addition to analysis of the destinations of outgoing network traffic.

As another example, in some embodiments, one or more of the operations 200 may not be included. For example, the operations of 450, 452, 454, 456, and 458 may not be included. In these and other embodiments, the destinations may be analyzed without comparing the destinations to known destinations. Alternatively or additionally, the operations 464 and 466 may not be included. In these and other embodiments, the device 420 may capture the outgoing network traffic and provide the outgoing network traffic to the integrity server 430.

As another example, in some embodiments, none of the operations may be performed by the integrity server 430. In these and other embodiments, the device 420 may perform all of the operations associated with the integrity server 430. Alternatively or additionally, none of the operations may be performed by the proxy server 440. In these and other embodiments, the device 420 and/or the integrity server 430 may perform all of the operations associated with the proxy server 440. In some embodiments, none of the operations may be performed by the device 420. In these and other embodiments, the integrity server 430 may perform all of the operations associated with the device 420. Alternatively or additionally, the proxy server 440 may perform some of the operations performed by the integrity server 430. For example, the proxy server 440 may perform the operations 458 and 470 and provide the destinations to the integrity server 430.

Figure 5:
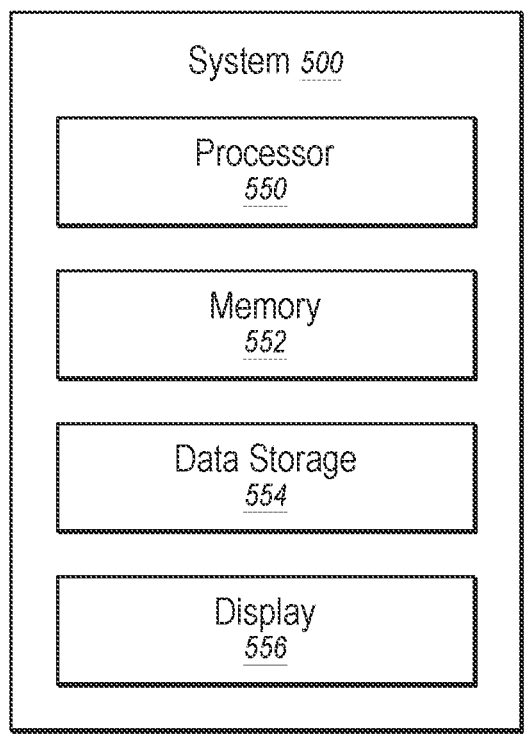
FIG. 5 illustrates an example system that may be used to monitor integrity of webpages.

FIG. 5 illustrates a block diagram of an example computing system 500. The computing system 500 may be configured according to at least one embodiment of the present disclosure and may be configured to perform one or more operations related to monitoring the integrity of webpages. The computing system 500 may include a processor 550, a memory 552, a data storage 554, and a display 556. The processor 550, the memory 552, the data storage 554, and the display 556 may be communicatively coupled.

In general, the processor 550 may include any suitable special-purpose or general-purpose computer, computing entity, or processing device including various computer hardware or software modules and may be configured to execute instructions stored on any applicable computer-readable storage media. For example, the processor 550 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, the processor 550 may include any number of processors configured to, individually or collectively, perform or direct performance of any number of operations described in the present disclosure. Additionally, one or more of the processors may be present on one or more different electronic devices, such as different servers.

In some embodiments, the processor 550 may be configured to interpret and/or execute program instructions and/or process data stored in the memory 552, the data storage 554, or the memory 552 and the data storage 554. In some embodiments, the processor 550 may fetch program instructions from the data storage 554 and load the program instructions in the memory 552. After the program instructions are loaded into memory 552, the processor 550 may execute the program instructions.

For example, in some embodiments, the computing system 500 may be part of the web server 110 or the web server 210. In these and other embodiments, the example computing system 500 may be configured to verify integrity of source code and provide the source code in response to a request for the source code, among other operations.

As another example, the computing system 500 may be part of the device 120, the device 220, the device 320, or the device 420. In these and other embodiments, the computing system 500 may be configured to navigate to a webpage, display the webpage on the display 556, obtain source code and remotely called code of the webpage, generated rendered code, analyze the rendered code, and display an alert on the display 556 in response to the analysis of the rendered code indicating the integrity of security of the source code is changed, among other operations.

As another example, the computing system 500 may be part of the integrity server 130, the integrity server 230, the integrity server 330, and the integrity server 430. In these and other embodiments, the computing system 500 may be configured to generate known rendered code and provide the rendered code, among other operations.

As another example, the computing system 500 may be part of the proxy server 340 or the proxy server 440. In these and other embodiments, the computing system 500 may be configured to capture network traffic resulting from rendered code.

The memory 552 and the data storage 554 may include computer-readable storage media for carrying or having computer-executable instructions or data structures stored thereon. Such computer-readable storage media may include any available media that may be accessed by a general-purpose or special-purpose computer, such as the processor 550. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Modifications, additions, or omissions may be made to the computing system 500 without departing from the scope of the present disclosure. For example, in some embodiments, the computing system 500 may include any number of other components that may not be explicitly illustrated or described.

Figure 6:
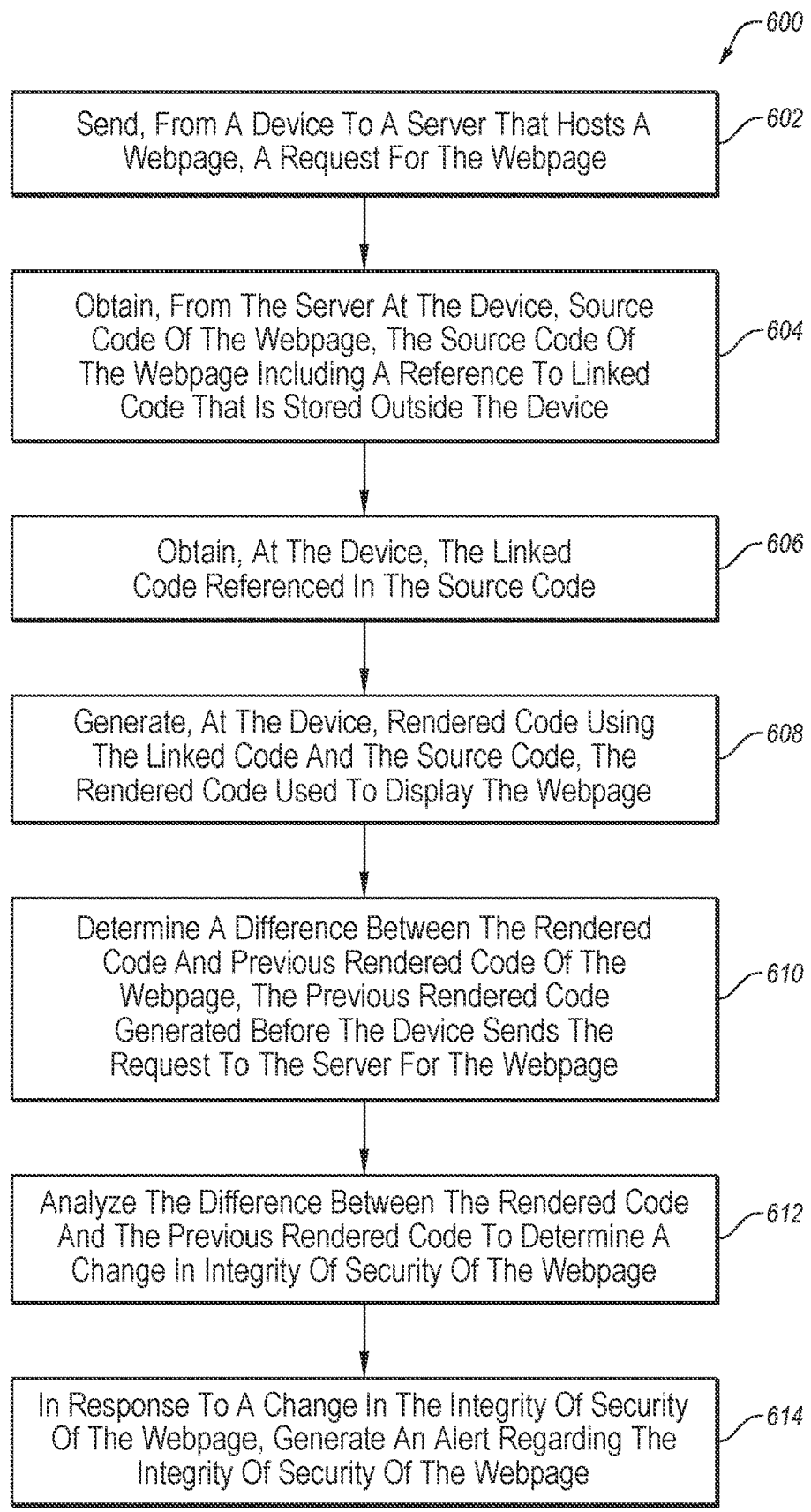
FIG. 6 is a flowchart of an example method to monitor integrity of webpages.

FIG. 6 is a flowchart of an example method 600 to monitor integrity of webpages. The method 600 may be arranged in accordance with at least one embodiment described in the present disclosure. The method 600 may be performed, in some embodiments, by a device or system, such as the device 120 and/or the integrity server 130 of FIG. 1, the device 220 and/or the integrity server 230 of FIGS. 2A and 2B, the device 320 and/or integrity server 330 of FIG. 3, the device 420 and/or integrity server 430 of FIG. 4, or the computing system 500 of FIG. 5, or another device. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where a request for a webpage is sent from a device to a server that hosts the webpage. In some embodiments, before the request for the webpage is sent, the integrity of security of the source code of the webpage may be evaluated at the server that hosts the source code of the webpage.

At block 604, source code of the webpage may be obtained from the server at the device. The source code of the webpage may include a reference to remotely called code that is stored outside the device.

At block 606, the remotely called code referenced in the source code may be obtained at the device. At block 608, rendered code may be generated at the device using the remotely called code and the source code. The rendered code may be used to display the webpage.

At block 610, a difference between the rendered code and previous rendered code of the webpage may be determined. The previous rendered code may be generated before the device sends the request to the server for the webpage. In some embodiments, the previous rendered code may be generated using second remotely called code that is different than the remotely called code. In these and other embodiments, the differences between the rendered code and previous rendered code may be based on a difference between the second remotely called code and the remotely called code.

In some embodiments, the rendered code may be generated using a browser application or other application using the remotely called code and using the source code. In these and other embodiments, the previous rendered code may be generated by a same type of browser application or other application as the browser application or other application that generates the rendered code. Alternatively or additionally, the previous rendered code of the webpage may be obtained from a second server distinct from the server that hosts the webpage.

At block 612, the difference between the rendered code and the previous rendered code may be analyzed to determine a change in integrity of security of the webpage. In some embodiments, analyzing the difference between the rendered code and the previous rendered code may include determining when the difference between the rendered code and the previous rendered code occurs in a location of the rendered code that is not changed when generated by different devices.

At block 614, in response to a change in the integrity of security of the webpage, an alert regarding the integrity of security of the webpage may be generated. In some embodiments, in response to the alert, an indication of the integrity of security of the webpage may be displayed on the device concurrent with a display of the webpage using the rendered code.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 600 may further include before determining the difference, sending the rendered code to a second server distinct from the server that hosts the webpage. In these and other embodiments, the second server performs the steps of: determining the difference between the rendered code and the previous rendered code of the webpage, analyzing the difference between the rendered code and the previous rendered code, and generating an alert.

Alternatively or additionally, the method 600 may further include hashing the rendered code. In these and other embodiments, the difference between the rendered code and the previous rendered code of the webpage may be determined by comparing the hashes of the rendered code with hashes of the previous rendered code.

Figure 7:
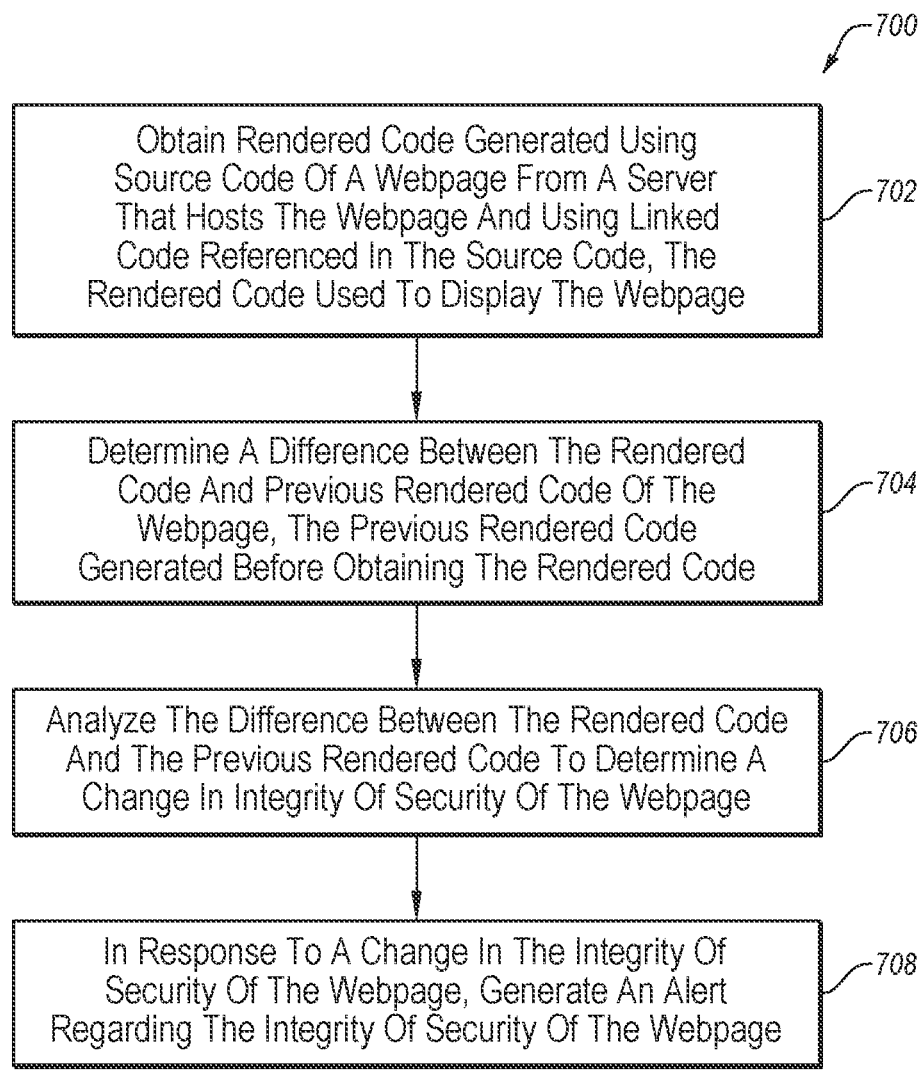
FIG. 7 is a flowchart of another example method to monitor integrity of webpages.

FIG. 7 is a flowchart of another example method 700 to monitor integrity of webpages. The method 700 may be arranged in accordance with at least one embodiment described in the present disclosure. The method 700 may be performed, in some embodiments, by a device or system, such as the device 120 and/or the integrity server 130 of FIG. 1, the device 220 and/or the integrity server 230 of FIGS. 2A and 2B, the device 320 and/or integrity server 330 of FIG. 3, the device 420 and/or integrity server 430 of FIG. 4, or the computing system 500 of FIG. 5, or another device. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 700 may begin at block 702, where rendered code generated using source code of a webpage from a server that hosts the webpage and using remotely called code referenced in the source code may be obtained. The rendered code may be used to display the webpage. In some embodiments, before obtaining the rendered code, the integrity of security of the source code of the webpage may be evaluated at the server that hosts the source code of the webpage.

At block 704, a difference between the rendered code and previous rendered code of the webpage may be determined. The previous rendered code may be generated before obtaining the rendered code. In some embodiments, the previous rendered code may be generated using second remotely called code that is different than the remotely called code. In these and other embodiments, the difference between the rendered code and previous rendered code may be based on a difference between the second remotely called code and the remotely called code. In some embodiments, the previous rendered code of the webpage may be obtained from a second server distinct from the server that hosts the webpage.

Alternatively or additionally, the rendered code may be generated using a browser application or other application using the remotely called code and using the source code. In these and other embodiments, the previous rendered code may be generated by a same type of browser application or other application as the browser application or other application that generates the rendered code.

At block 706, the difference between the rendered code and the previous rendered code may be analyzed to determine a change in integrity of security of the webpage. In these and other embodiments, analyzing the difference between the rendered code and the previous rendered code may include determining when the difference between the rendered code and the previous rendered code occurs in a location of the rendered code that is not changed when generated by different devices.

At block 708, in response to a change in the integrity of security of the webpage, an alert may be generated regarding the integrity of security of the webpage.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 700 may further include hashing the rendered code. In these and other embodiments, the difference between the rendered code and the previous rendered code of the webpage may be determined by comparing the hashes of the rendered code with hashes of the previous rendered code.

Figure 8:
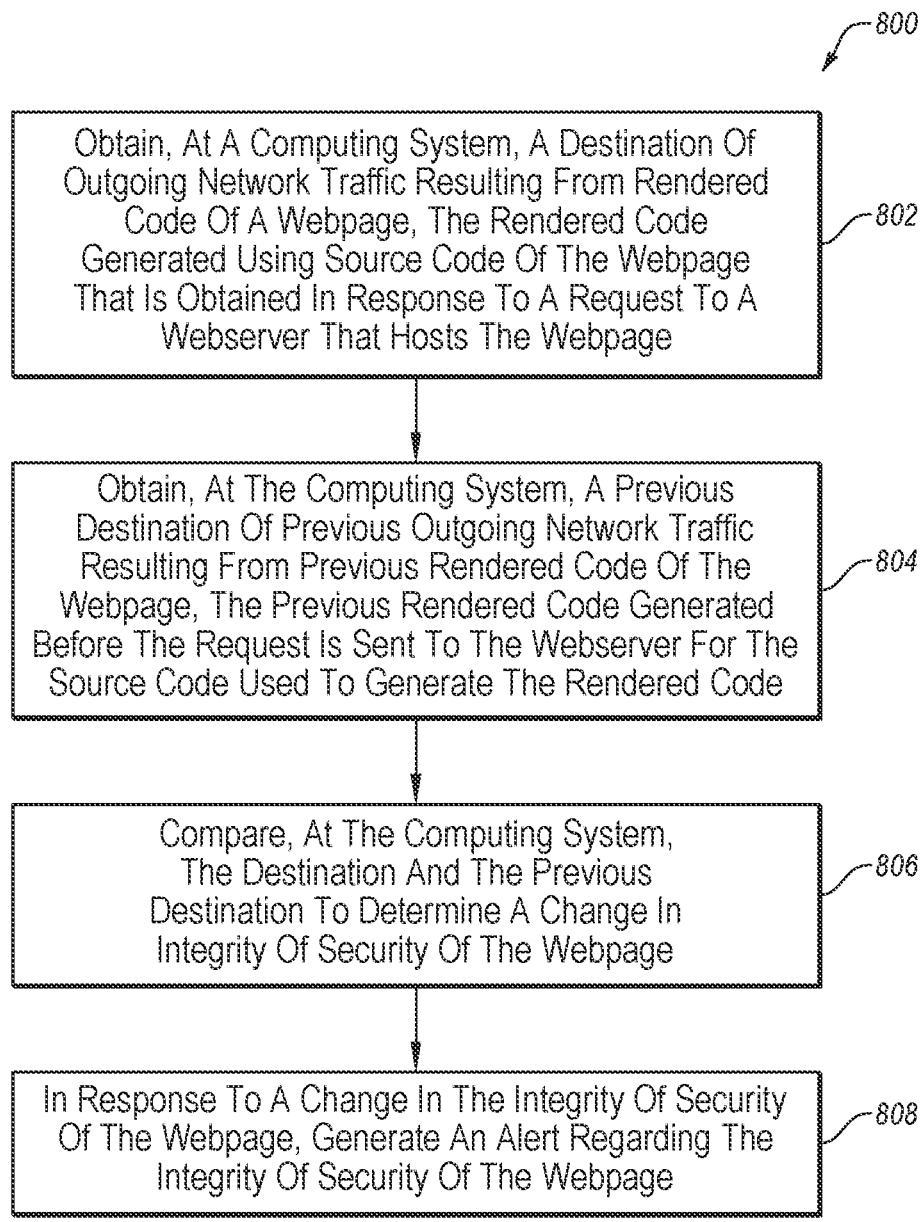
FIG. 8 is a flowchart of another example method to monitor integrity of webpages.

FIG. 8 is a flowchart of another example method 800 to monitor integrity of webpages. The method 800 may be arranged in accordance with at least one embodiment described in the present disclosure. The method 800 may be performed, in some embodiments, by a device or system, such as the device 120 and/or the integrity server 130 of FIG. 1, the device 220 and/or the integrity server 230 of FIGS. 2A and 2B, the device 320 and/or integrity server 330 of FIG. 3, the device 420 and/or integrity server 430 of FIG. 4, or the computing system 500 of FIG. 5, or another device. In these and other embodiments, the method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 800 may begin at block 802, where a destination of outgoing network traffic resulting from rendered code of a webpage may be obtained. The rendered code may be generated using source code of the webpage that is obtained in response to a request to a webserver that hosts the webpage.

In some embodiments, the outgoing network traffic may include hypertext transfer protocol posts. In some embodiments, obtaining the previous destination of the previous outgoing network traffic may include analyzing the previous rendered code of the webpage to determine the previous destination.

In some embodiments, the rendered code may be also generated using remotely called code referenced in the source code. In these and other embodiments, the rendered code may include finalized instructions to layout presentation of the webpage and the rendered code may include elements not represented in the remotely called code and the source code without parsing and/or executing the remotely called code and the source code.

In some embodiments, obtaining the destination of the outgoing network traffic may include capturing the outgoing network traffic resulting from the rendered code of the webpage and parsing the outgoing network traffic to determine the destination. In these and other embodiments, the outgoing network traffic may be captured by a proxy computing system. The proxy computing system may be separate from a computing system that obtains the destination of the outgoing network traffic.

At block 804, a previous destination of previous outgoing network traffic resulting from previous rendered code of the webpage may be obtained. The previous rendered code may be generated before the request is sent to the webserver for the source code used to generate the rendered code.

In some embodiments, obtaining the previous destination of the previous outgoing network traffic may include capturing the previous outgoing network traffic resulting from the previous rendered code of the webpage and parsing the previous outgoing network traffic to determine the previous destination.

At block 806, the destination and the previous destination may be compared to determine a change in integrity of security of the webpage. In some embodiments, the change in integrity of security of the webpage may be determined based on a difference between the destination and the previous destination determined by comparing the destination and the previous destination.

In some embodiments, the rendered code may be generated using remotely called code and the previous rendered code may be generated using second remotely called code that is different than the remotely called code. In these and other embodiments, the difference between the destination and the previous destination may be based on a difference between the second remotely called code and the remotely called code.

In some embodiments, the destination may include multiple destinations and the previous destination may include multiple previous destinations. In these and other embodiments, the multiple destinations may be different from the multiple previous destinations based on the multiple destinations including more destinations than the multiple previous destinations.

At block 808, in response to a change in the integrity of security of the webpage, an alert regarding the integrity of security of the webpage may be generated.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

As indicated above, the embodiments described herein may include the use of a special purpose or general purpose computer (e.g., the processor 550 of FIG. 5) including various computer hardware or software modules, as discussed in greater detail below. Further, as indicated above, embodiments described herein may be implemented using computer-readable media (e.g., the memory 552 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method to monitor integrity of webpages, the method comprising:

obtaining, at a computing system, a final network destination of outgoing network traffic resulting from rendered code of a webpage, the rendered code generated using source code of the webpage that is obtained in response to a request to a webserver that hosts the webpage and using remotely called code referenced in the source code, wherein the rendered code is finalized instructions to layout presentation of the webpage, the rendered code includes elements not represented in the remotely called code and the source code without parsing and/or executing the remotely called code and the source code, and a portion of the rendered code that causes the outgoing network traffic to the final network destination results from the remotely called code;

obtaining, at the computing system, one or more network destinations previously obtained;

comparing, at the computing system, the final network destination and the one or more network destinations to determine a change in integrity of security of the webpage; and in response to the change in the integrity of security of the webpage, generating an alert regarding the integrity of security of the webpage.

2. The method of claim 1, wherein obtaining the final network destination of the outgoing network traffic further comprises:
capturing the outgoing network traffic resulting from the rendered code of the webpage; and
parsing the outgoing network traffic to determine the final network destination.

3. The method of claim 2, wherein the outgoing network traffic is captured by a proxy computing system separate from the computing system.

4. The method of claim 1, wherein obtaining the one or more network destinations comprises:
capturing previous outgoing network traffic resulting from previous rendered code of the webpage, the previous rendered code generated before the request is sent to the webserver for the source code used to generate the rendered code; and
parsing the previous outgoing network traffic to determine the one or more network destinations.

5. The method of claim 1, wherein obtaining the one or more network destinations comprises analyzing previous rendered code of the webpage to determine the one or more network destinations, the previous rendered code generated before the request is sent to the webserver for the source code used to generate the rendered code.

6. The method of claim 1, wherein a device separate from the computing system generates the rendered code.

7. The method of claim 1, wherein the final network destination includes a plurality of final network destinations and the one or more network destinations includes a plurality of network destinations and the plurality of final network destinations are different from the plurality of network destinations based on the plurality of final network destinations including more final network destinations than the plurality of network destinations.

8. The method of claim 1, wherein the change in the integrity of the webpage is determined based on the portion of the rendered code that causes the outgoing network traffic to the final network destination resulting from the remotely called code.

9. A system comprising:
at least one non-transitory computer-readable media configured to store one or more instructions; and
at least one processor coupled to the at least one non-transitory computer-readable media, the at least one processor configured to execute the instructions to cause or direct the system to perform operations, the operations comprising:
obtain, at a computing system, a final network destination of outgoing network traffic resulting from rendered code of a webpage, the rendered code generated using source code of the webpage that is obtained in response to a request to a webserver that hosts the webpage and using remotely called code referenced in the source code, wherein the rendered code is finalized instructions to layout presentation of the webpage, the rendered code includes elements not represented in the remotely called code and the source code without parsing and/or executing the remotely called code and the source code, and a portion of the rendered code that causes the outgoing network traffic to the final network destination results from the remotely called code;
obtain, at the computing system, one or more network destinations previously obtained;
compare, at the computing system, the final network destination and the one or more network destinations to determine a change in integrity of security of the webpage; and
in response to the change in the integrity of security of the webpage, generate an alert regarding the integrity of security of the webpage.

10. The system of claim 9, wherein obtaining the final network destination of the outgoing network traffic further includes operations including:
capture the outgoing network traffic resulting from the rendered code of the webpage; and
parse the outgoing network traffic to determine the final network destination.

11. The system of claim 10, wherein the outgoing network traffic is captured by a proxy computing system separate from the system.

12. The system of claim 9, wherein obtaining the one or more network destinations further includes operations including:
capture previous outgoing network traffic resulting from previous rendered code of the webpage, the previous rendered code generated before the request is sent to the webserver for the source code used to generate the rendered code; and
parse the previous outgoing network traffic to determine the one or more network destinations.

13. The system of claim 9, wherein obtaining the one or more network destinations further includes operations including: analyze previous rendered code of the webpage to determine the one or more network destinations, the previous rendered code generated before the request is sent to the webserver for the source code used to generate the rendered code.

14. The system of claim 9, wherein a device separate from the system generates the rendered code.

15. The system of claim 9, wherein the final network destination includes a plurality of final network destinations and the one or more network destinations includes a plurality of network destinations and the plurality of final network destinations are different from the plurality of network destinations based on the plurality of final network destinations including more final network destinations than the plurality of network destinations.

16. The system of claim 9, wherein the change in the integrity of the webpage is determined based on the portion of the rendered code that causes the outgoing network traffic to the final network destination resulting from the remotely called code.

17. One or more non-transitory computer-readable media configured to store one or more instructions that when executed cause or direct a system to perform operations, the operations comprising:
obtain, at a computing system, a final network destination of outgoing network traffic resulting from rendered code of a webpage, the rendered code generated using source code of the webpage that is obtained in response to a request to a webserver that hosts the webpage and using remotely called code referenced in the source code, wherein the rendered code is finalized instructions to layout presentation of the webpage, the rendered code includes elements not represented in the remotely called code and the source code without parsing and/or executing the remotely called code and the source code, and a portion of the rendered code that causes the outgoing network traffic to the final network destination results from the remotely called code;

obtain, at the computing system, one or more network destinations previously obtained;

compare, at the computing system, the final network destination and the one or more network destinations to determine a change in integrity of security of the webpage; and in response to the change in the integrity of security of the webpage, generate an alert regarding the integrity of security of the webpage.

18. The one or more non-transitory computer-readable media of claim 17, wherein obtaining the one or more network destinations further includes operations including:

capture previous outgoing network traffic resulting from previous rendered code of the webpage, the previous rendered code generated before the request is sent to the webserver for the source code used to generate the rendered code; and parse the previous outgoing network traffic to determine the one or more network destinations.

19. The one or more non-transitory computer-readable media of claim 17, wherein obtaining the one or more network destinations further includes operations including:

analyze previous rendered code of the webpage to determine the one or more network destinations, the previous rendered code generated before the request is sent to the webserver for the source code used to generate the rendered code.

20. The one or more non-transitory computer-readable media of claim 17, wherein the final network destination includes a plurality of final network destinations and the one or more network destinations includes a plurality of network destinations and the plurality of final network destinations are different from the plurality of network destinations based on the plurality of final network destinations including more final network destinations than the plurality of network destinations.

* * * * *